United States Patent
Yoda et al.

(10) Patent No.: US 9,086,428 B2
(45) Date of Patent: Jul. 21, 2015

(54) FUNCTIONAL DEVICE, METHOD OF MANUFACTURING THE FUNCTIONAL DEVICE, PHYSICAL QUANTITY SENSOR, AND ELECTRONIC APPARATUS

(75) Inventors: Mitsuhiro Yoda, Shiojir (JP); Shuichi Kawano, Suwa (JP); Shigekazu Takagi, Shimosuwa (JP); Seiji Yamazaki, Fujimi (JP)

(73) Assignee: Seiko Epson Corporation (JP)

( * ) Notice: Subject to any disclaimer, the term of this patent is extended or adjusted under 35 U.S.C. 154(b) by 222 days.

(21) Appl. No.: 13/277,511

(22) Filed: Oct. 20, 2011

(65) Prior Publication Data

US 2012/0111615 A1 May 10, 2012

(30) Foreign Application Priority Data

Nov. 4, 2010 (JP) ................................. 2010-247498

(51) Int. Cl.
| | |
|---|---|
| *G01P 15/125* | (2006.01) |
| *G01C 19/56* | (2012.01) |
| *H01S 4/00* | (2006.01) |
| *H01L 29/84* | (2006.01) |
| *H01L 21/08* | (2006.01) |
| *G01P 15/08* | (2006.01) |

(52) U.S. Cl.
CPC ........... *G01P 15/0802* (2013.01); *G01P 15/125* (2013.01); *G01P 2015/0814* (2013.01); *Y10T 29/49002* (2015.01)

(58) Field of Classification Search
USPC ............... 73/514.32, 514.36, 514.38, 504.12, 73/504.14, 504.04; 29/592.1; 257/415; 438/52
See application file for complete search history.

(56) References Cited

U.S. PATENT DOCUMENTS

| | | | | |
|---|---|---|---|---|
| 5,314,572 | A | * | 5/1994 | Core et al. ...................... 216/17 |
| 5,627,317 | A | | 5/1997 | Offenberg et al. |
| 5,719,073 | A | | 2/1998 | Shaw et al. |
| 5,756,901 | A | * | 5/1998 | Kurle et al. ..................... 73/777 |
| 5,987,989 | A | * | 11/1999 | Yamamoto et al. ........ 73/514.24 |
| 6,171,881 | B1 | | 1/2001 | Fujii |
| 6,239,473 | B1 | | 5/2001 | Adams et al. |
| 6,240,782 | B1 | * | 6/2001 | Kato et al. ................. 73/514.32 |
| 6,282,960 | B1 | * | 9/2001 | Samuels et al. ............ 73/514.32 |

(Continued)

FOREIGN PATENT DOCUMENTS

| | | |
|---|---|---|
| CN | 1605871 A | 4/2005 |
| CN | 101807663 A | 8/2010 |

(Continued)

OTHER PUBLICATIONS

Extended European Search Report for Application No. 11 18 7540.7 mailed on Feb. 24, 2012 (8 pages).

*Primary Examiner* — Helen Kwok
(74) *Attorney, Agent, or Firm* — Harness, Dickey & Pierce, P.L.C.

(57) ABSTRACT

A functional device according to an embodiment of the invention includes: an insulating substrate; a movable section; movable electrode fingers provided in the movable section; and fixed electrode fingers provided on the insulating substrate and arranged to be opposed to the movable electrode fingers. The fixed electrode fingers include: first fixed electrode fingers arranged on one side of the movable electrode fingers; and second fixed electrode fingers arranged on the other side of the movable electrode fingers. The first fixed electrode fingers and the second fixed electrode fingers are arranged to be spaced apart from each other.

20 Claims, 16 Drawing Sheets

(56) References Cited

U.S. PATENT DOCUMENTS

| | | | |
|---|---|---|---|
| 6,388,300 B1* | 5/2002 | Kano et al. | 257/419 |
| 6,450,031 B1* | 9/2002 | Sakai et al. | 73/514.16 |
| 6,536,280 B1* | 3/2003 | Carley | 73/504.02 |
| 6,759,591 B2* | 7/2004 | Yoshida et al. | 174/520 |
| 6,763,716 B2* | 7/2004 | Nagahara et al. | 73/493 |
| 6,997,054 B2* | 2/2006 | Tsugai | 73/504.12 |
| 7,267,006 B2* | 9/2007 | Malvern | 73/514.32 |
| 8,176,782 B2* | 5/2012 | Furukubo et al. | 73/514.32 |
| 8,283,738 B2* | 10/2012 | Fujii et al. | 257/415 |
| 2002/0178818 A1 | 12/2002 | Nakabayashi | |
| 2003/0176008 A1 | 9/2003 | Okumura et al. | |
| 2003/0180504 A1 | 9/2003 | Yoshida et al. | |
| 2003/0217597 A1* | 11/2003 | Kumagai et al. | 73/514.01 |
| 2004/0187573 A1* | 9/2004 | Sakai et al. | 73/514.01 |
| 2008/0028856 A1 | 2/2008 | Kikuiri et al. | |
| 2010/0176466 A1 | 7/2010 | Fujii et al. | |
| 2010/0207698 A1 | 8/2010 | Tange | |
| 2010/0242603 A1 | 9/2010 | Miller et al. | |
| 2013/0042685 A1* | 2/2013 | Yoda | 73/514.16 |

FOREIGN PATENT DOCUMENTS

| | | |
|---|---|---|
| DE | 197 58 847 | 10/2007 |
| JP | 05-304303 | 11/1993 |
| JP | 07-333078 | 12/1995 |
| JP | 08-136576 | 5/1996 |
| JP | 08-186275 A | 7/1996 |
| JP | 08-506857 | 7/1996 |
| JP | 2000-286430 | 10/2000 |
| JP | 2002-510139 | 4/2002 |
| JP | 2004-028912 | 1/2004 |
| JP | 2004-325361 A | 11/2004 |
| JP | 2006-349563 A | 12/2006 |
| JP | 2008-039593 A | 2/2008 |
| JP | 2008-039595 A | 2/2008 |
| JP | 4238437 | 1/2009 |
| JP | 2010-223640 A | 10/2010 |
| WO | 92-03740 | 3/1992 |
| WO | WO-02-103368 A1 | 12/2002 |
| WO | WO-03-001608 A1 | 1/2003 |

\* cited by examiner

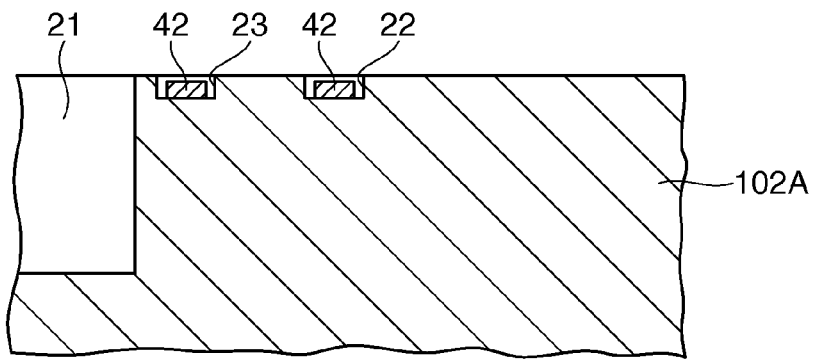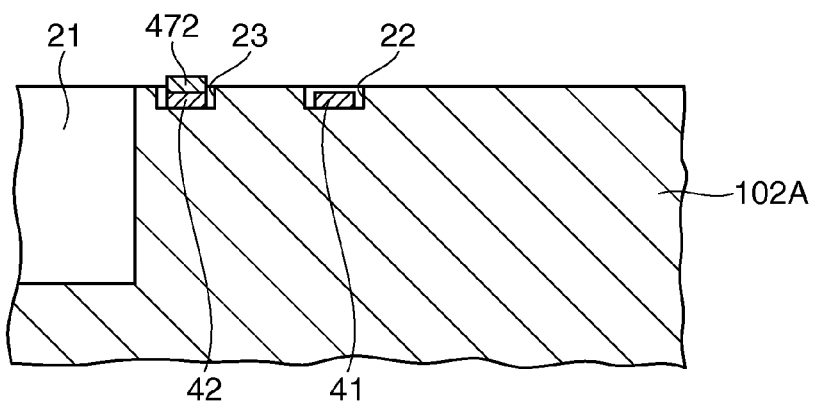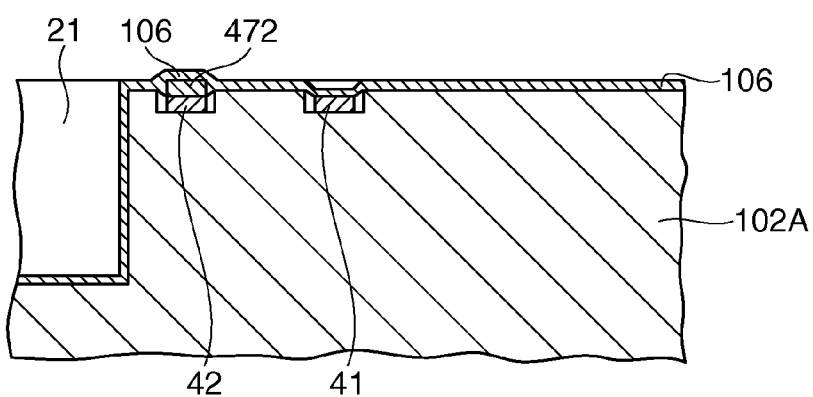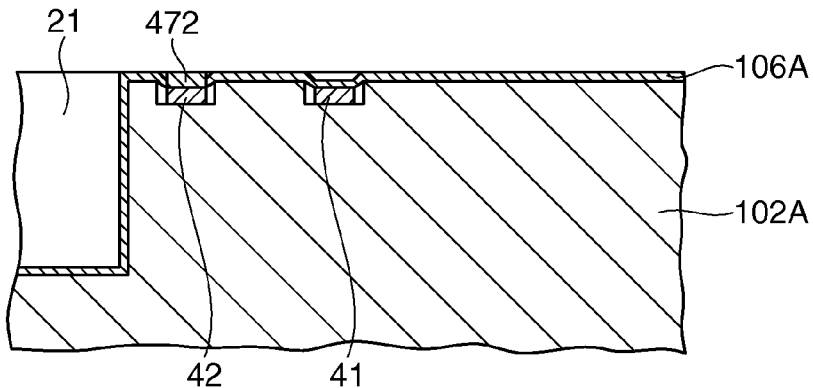

FUNCTIONAL DEVICE, METHOD OF MANUFACTURING THE FUNCTIONAL DEVICE, PHYSICAL QUANTITY SENSOR, AND ELECTRONIC APPARATUS

BACKGROUND

1. Technical Field

The present invention relates to a functional device, a method of manufacturing the functional device, a physical quantity sensor, and an electronic apparatus.

2. Related Art

As a functional device, a physical quantity sensor device is known that includes a fixed electrode arranged to be fixed and a movable electrode spaced apart from and opposed to the fixed electrode and provided to be displaceable and that detects physical quantities such as acceleration and angular velocity on the basis of the capacitance between the fixed electrode and the movable electrode (see, for example, Japanese Patent No. 4238437 (Patent Document 1)).

For example, in the physical quantity sensor device described in Patent Document 1, a single-layer semiconductor substrate or an SOI substrate is used. Each of the fixed electrode and the movable electrode includes plural electrode fingers arranged to form a comb teeth shape. The fixed electrode and the movable electrode are arranged to mesh with each other.

In the physical quantity sensor device described in Patent Document 1, two electrode fingers of the fixed electrode are provided between adjacent two electrode fingers of the movable electrode to face the electrode fingers. The two electrode fingers of the fixed electrode are electrically insulated from each other. Consequently, it is possible to separately measure the capacitance between one electrode finger of the two electrode fingers of the fixed electrode and an electrode finger of the movable electrode opposed to one electrode finger and the capacitance between the other electrode finger of the two electrode fingers of the fixed electrode and an electrode finger of the movable electrode opposed to the other electrode finger and detect physical quantities on the basis of results of the measurement (using so-called differential detection system).

However, in the physical quantity sensor described in Patent Document 1, it is necessary to individually insulate and separate the electrode fingers to prevent the fixed electrode and the movable electrode from becoming conductive to each other. Therefore, manufacturing efficiency is low. In the differential detection system, sensitivity rises when the thickness of the fixed electrode and the movable electrode is large (an aspect ratio is high). However, in the case of Patent Document 1, it is necessary to apply first etching in the thickness direction of the substrate and then apply second etching in the lateral direction of the substrate. To increase the thickness of the fixed electrode and the movable electrode, it is necessary to form the substrate thick in advance. Therefore, it is difficult to increase the thickness of the electrodes from the viewpoint of manufacturing efficiency. In general, the SOI substrate is expensive and manufacturing cost increases.

SUMMARY

An advantage of some aspects of the present invention is to provide a functional device, a method of manufacturing the functional device, a physical quantity sensor, and an electronic apparatus including the physical quantity sensor that realize at least one of an increase in sensitivity, improvement of manufacturing efficiency, a reduction in cost, and improvement of reliability.

An aspect of the invention is directed to a functional device including: an insulating substrate; a movable section; a movable electrode finger provided in the movable section; and a fixed electrode finger provided on the insulating substrate and arranged to be opposed to the movable electrode finger. The fixed electrode finger includes: a first fixed electrode finger arranged on one side of the movable electrode finger; and a second fixed electrode finger arranged on the other side of the movable electrode finger. The first fixed electrode finger and the second fixed electrode finger are arranged to be spaced apart from each other.

With the functional device having such a configuration, since the fixed electrode finger is formed on the insulating substrate, it is unnecessary to embed insulating films respectively in the movable electrode finger and the fixed electrode finger to insulate and separate the movable electrode finger and the fixed electrode finger. Therefore, manufacturing efficiency is extremely high. Since it is unnecessary to use the expensive SOI substrate, manufacturing cost can be held down.

Since the movable section, the movable electrode finger, and the fixed electrode finger can be collectively formed from separate substrates, manufacturing efficiency is extremely high. Each of the movable electrode fingers and the fixed electrode fingers can be formed only by etching in the thickness direction of the substrate. Therefore, it is possible to easily form the electrode fingers thick compared with Patent Document 1. For example, when the functional device is used as a physical quantity sensor device, it is possible to realize an increase in sensitivity.

In the functional device according to the aspect of the invention, it is preferred that a fixed section is provided on the insulating substrate and the movable section is connected to the fixed section via a coupling section.

Consequently, it is possible to displaceably support the movable section, for example, if a spring member is used in the coupling section. It is possible to apply the functional device to a physical quantity sensor device and the like.

In the functional device according to the aspect of the invention, it is preferred that at least one of a first line electrically connected to the first fixed electrode finger and a second line electrically connected to the second fixed electrode finger is provided on the insulating substrate.

Consequently, for example, when the functional device is used as a physical quantity sensor device, it is possible to separately measure, using the first line and the second line, the capacitance between the first fixed electrode finger and the movable electrode finger and the capacitance between the second fixed electrode finger and the movable electrode finger and, for example, if a differential operation is performed on the basis of results of the measurement, it is possible to highly accurately detect a physical quantity. Since lines such as the first line and the second line are provided on a surface of the insulating substrate on the fixed electrode finger side, it is possible to secure a large area of a formation region of the lines and prevent the lines from being short-circuited each other.

In the functional device according to the aspect of the invention, it is preferred that a recessed section is provided in the insulating substrate and the lines are provided in the recessed section.

Consequently, it is possible to prevent the first line and the second line from projecting from the surface of the insulating substrate. Therefore, it is possible to prevent an unintended electrical connection (short circuit) of the first and second lines and other regions.

In the functional device according to the aspect of the invention, it is preferred that at least one of the first fixed electrode finger and the second fixed electrode finger is connected to the lines via protrusions having electrical conductivity.

Consequently, for example, the first line and the first fixed electrode finger are connected by the conductive protrusion and the second line and the second fixed electrode finger are connected by the conductive protrusion, whereby it is possible to surely make the fixed electrode finger and the line conductive and realize a functional device having high reliability.

In the functional device according to the aspect of the invention, it is preferred that the lines include portions where an insulating film is provided.

Consequently, since it is possible to surely prevent an unintended electrical connection (short circuit) of the lines and other regions using the insulating film, it is possible to realize a functional device having high reliability.

In the functional device according to the aspect of the invention, it is preferred that a conductor section piercing through at least one of the first fixed electrode finger and the second fixed electrode finger in the thickness direction thereof is provided in the fixed electrode finger and the conductor section is connected to the lines.

Consequently, for example, if the fixed electrode finger is bonded on the insulating substrate and then the conductor section is formed on the inside of a hole piercing through the fixed electrode finger, the first fixed electrode finger and the first line are electrically connected, and the second fixed electrode finger and the second line are electrically connected, it is possible to more surely connect the fixed electrode finger and the lines. Therefore, it is possible to realize a functional device having high reliability.

In the functional device according to the aspect of the invention, it is preferred that the lines are formed of a light-transmissive electrode material.

Consequently, when the insulating substrate is a transparent substrate of, for example, glass, it is possible to easily visually recognize foreign matters or the like present on the surface of the insulating substrate on the fixed electrode finger side from a surface side opposite to the fixed electrode finger of the insulating substrate. Therefore, it is possible to provide a functional device excellent in reliability.

In the functional device according to the aspect of the invention, it is preferred that the insulating substrate is formed of a material containing an alkali metal ion, the fixed electrode finger is formed of a semiconductor, and the fixed electrode finger is bonded to the insulating substrate by an anode bonding method.

Consequently, for example, if the insulating substrate and a semiconductor substrate are bonded by anode bonding and then subjected to etching, it is possible to collectively form the movable section, the movable electrode finger, and the fixed electrode finger. Therefore, it is possible to realize a functional device excellent in manufacturing efficiency.

In the functional device according to the aspect of the invention, it is preferred that the fixed electrode finger is formed of a single member.

Consequently, for example, if first fixed electrode fingers or second fixed electrode fingers are integrally formed using a semiconductor substrate, it is possible to reduce electric resistance between the fixed electrode fingers. As a result, when the functional device is used as a physical quantity sensor device, it is possible to increase detection accuracy.

In the functional device according to the aspect of the invention, it is preferred that a plurality of the first fixed electrode fingers and a plurality of the second fixed electrode fingers are provided. At least one of the first fixed electrode fingers and the second fixed electrode fingers are integrally provided.

Consequently, unlike Patent Document 1, it is unnecessary to embed insulating films in a part of the fixed electrode finger and the movable electrode finger to insulate and separate the fixed electrode finger and the movable electrode finger. It is possible to realize a functional device excellent in manufacturing efficiency.

Another aspect of the invention is directed to a method of manufacturing a functional device including: forming a hollow section in a first substrate; placing a second substrate on the first substrate; and etching the second substrate to thereby form a fixed section provided on the first substrate, a movable section including a movable electrode finger and arranged on the hollow section, a coupling section that couples the movable section and the fixed section, and a fixed electrode finger provided on the first substrate and arranged to be opposed to the movable electrode finger.

Consequently, it is possible to collectively form, through etching, the fixed section, the movable section, the coupling section, the fixed electrode finger, and the movable electrode finger. Therefore, it is possible to provide a method of manufacturing a functional device excellent in manufacturing efficiency.

Still another aspect of the invention is directed to a physical quantity sensor including the functional device according to the aspect of the invention.

Consequently, it is possible to realize a physical quantity sensor that has the effects explained above.

Yet another aspect of the invention is directed to an electronic apparatus including the functional device according to the aspect of the invention.

Consequently, it is possible to realize an electronic apparatus that has the effects explained above.

BRIEF DESCRIPTION OF THE DRAWINGS

The invention will be described with reference to the accompanying drawings, wherein like numbers reference like elements.

FIGS. 9A to 9D are diagrams for explaining a step shown in FIG. 7C (a step for forming lines, contacts, and an insulating film).

DESCRIPTION OF EXEMPLARY EMBODIMENTS

A functional device, a method of manufacturing the functional device, a physical quantity sensor, and an electronic apparatus according to embodiments of the invention are explained below with reference to the accompanying drawings.

First Embodiment

Figure 1:
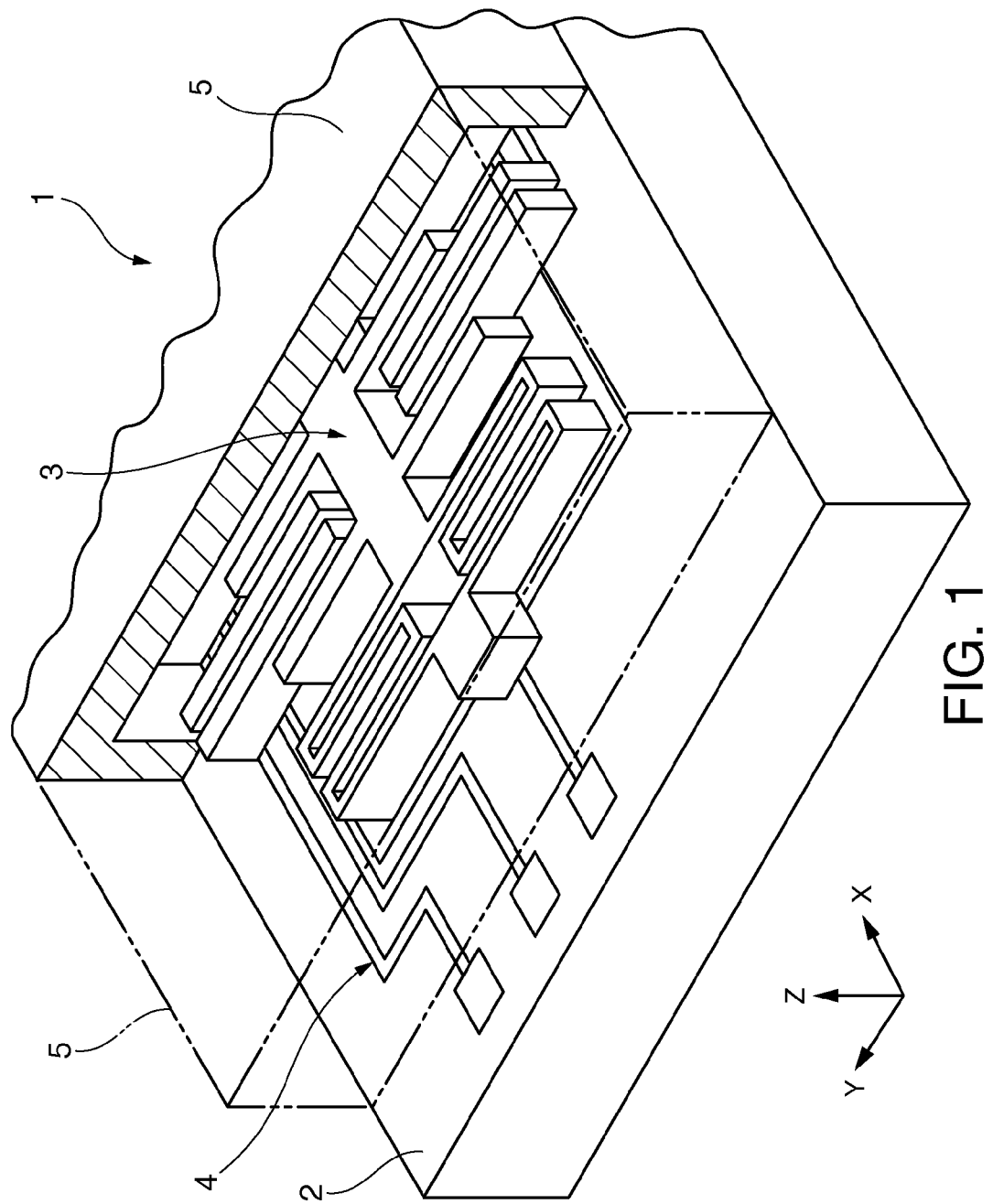
FIG. 1 is a perspective view showing a functional device according to a first embodiment of the invention.
Figure 2:
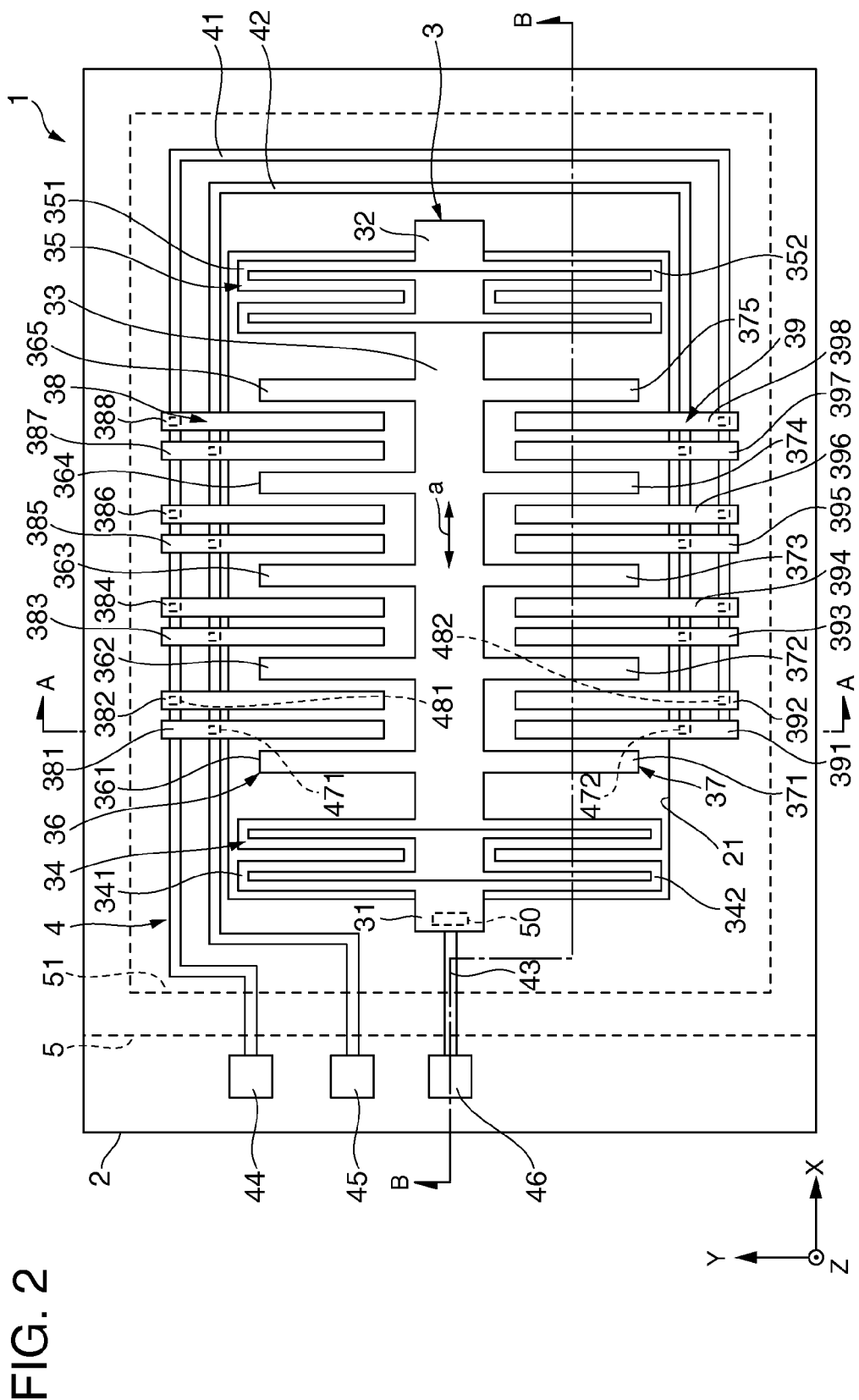
FIG. 2 is a plan view showing the functional device shown in FIG. 1.
Figure 3:
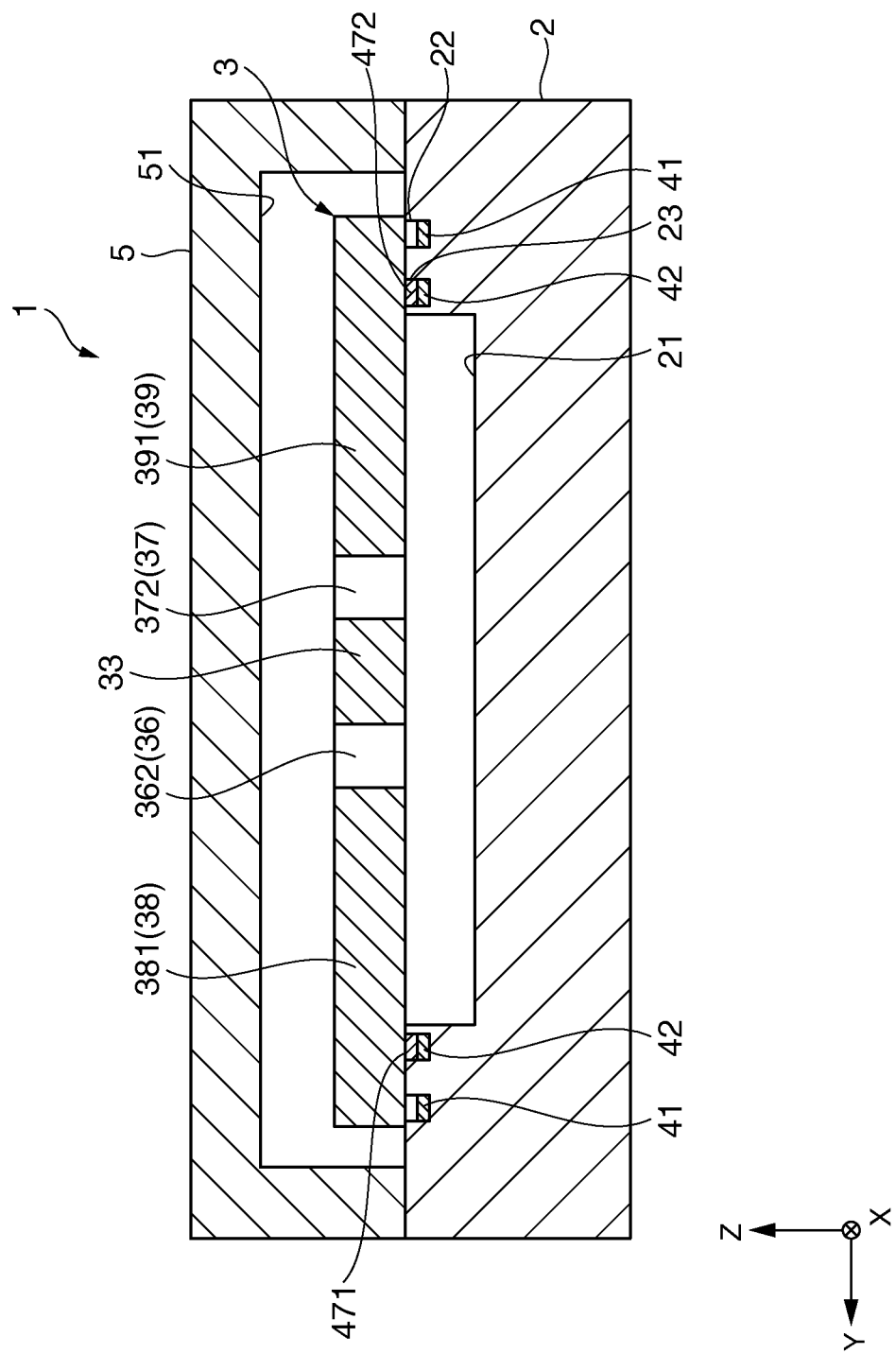
FIG. 3 is a sectional view taken along line A-A in FIG. 2.
Figure 4:
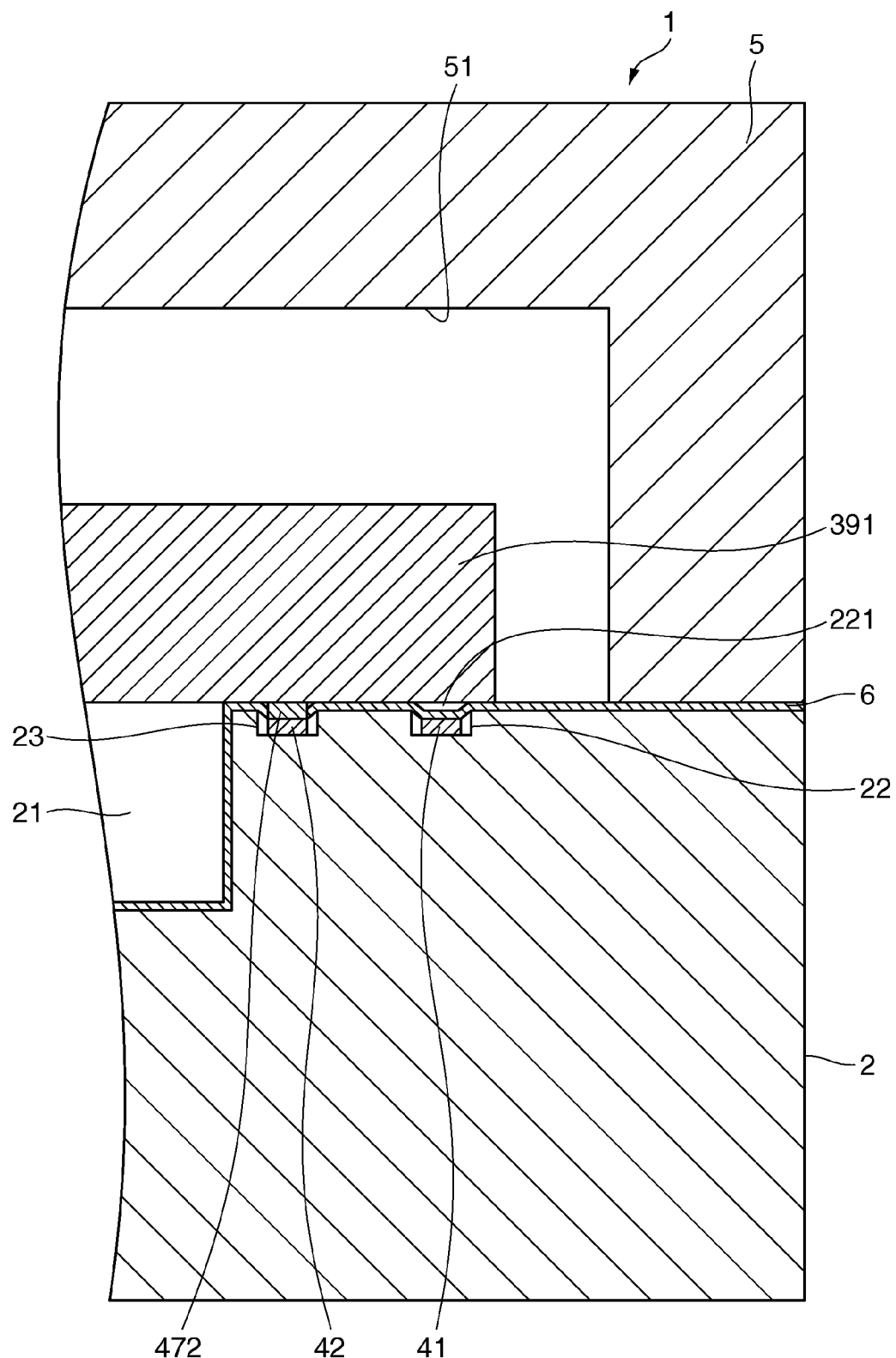
FIG. 4 is a partially enlarged view (a partially enlarged sectional view) of FIG. 3.
Figure 5:
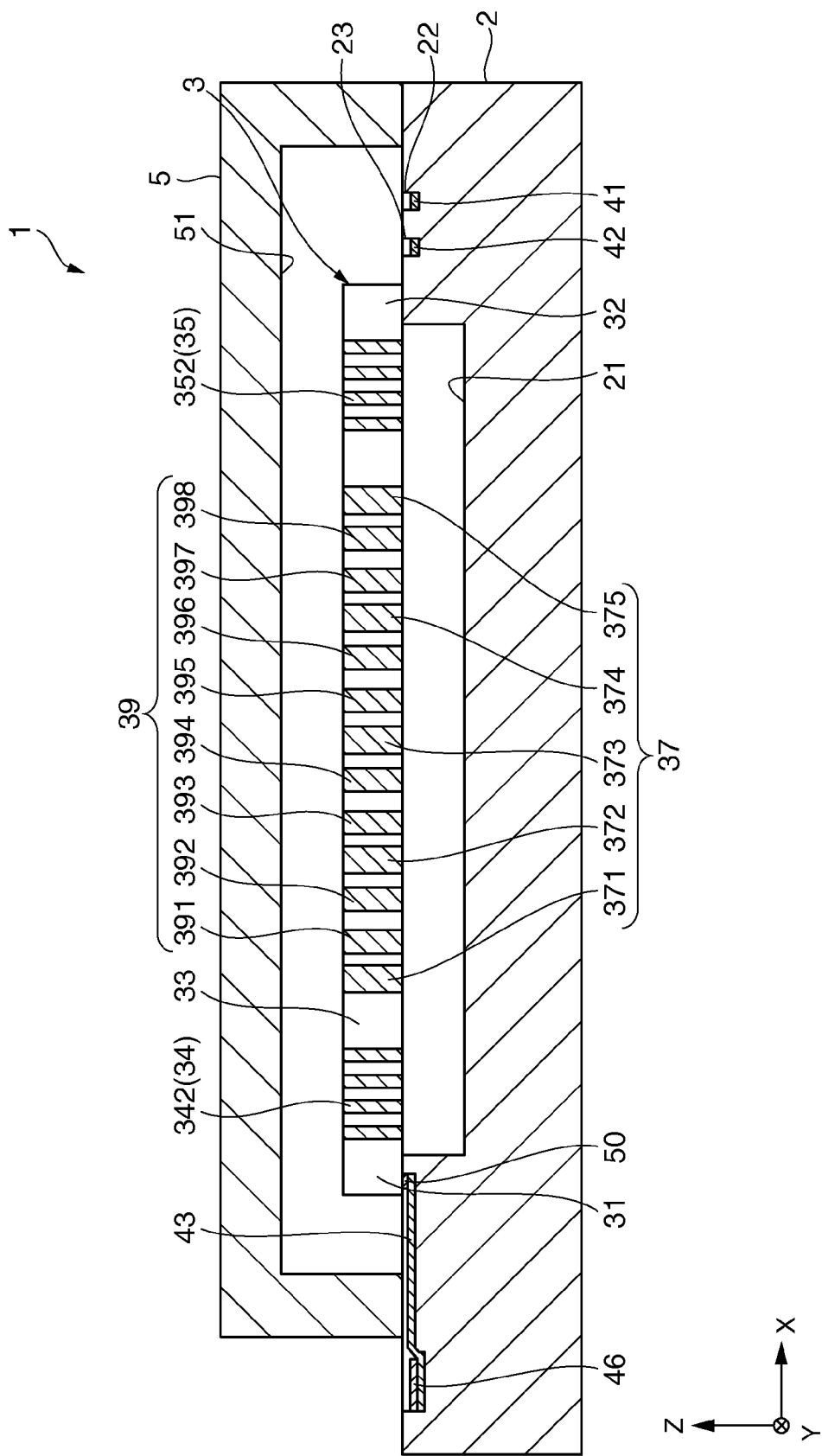
FIG. 5 is a sectional view taken along line B-B in FIG. 2.
Figure 6:
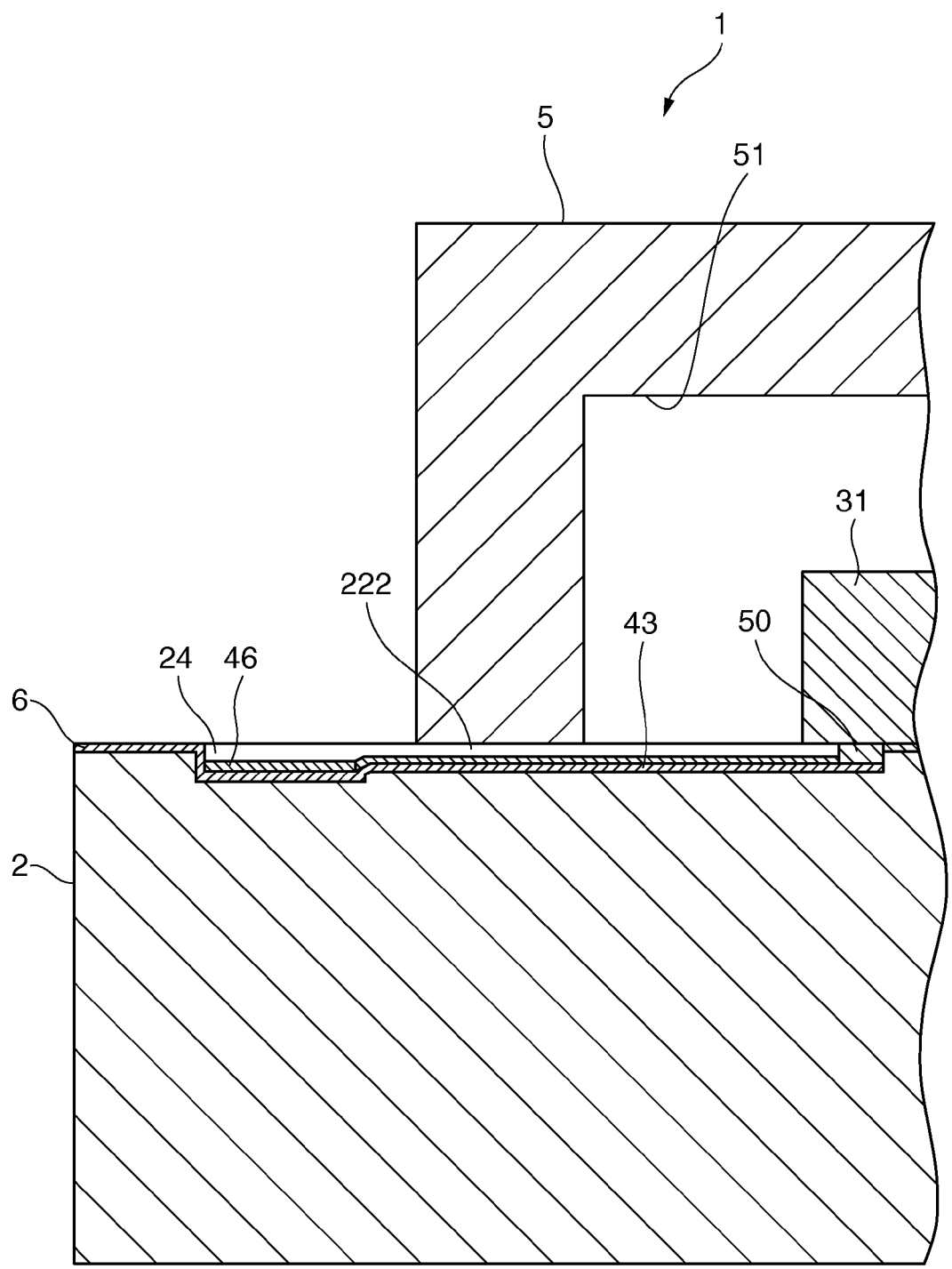
FIG. 6 is a partially enlarged view (a partially enlarged sectional view) of FIG. 5.

FIG. 1 is a perspective view showing a functional device according to a first embodiment of the invention. FIG. 2 is a plan view showing the functional device shown in FIG. 1. FIG. 3 is a sectional view taken along line A-A in FIG. 2. FIG. 4 is a partially enlarged view (a partially enlarged sectional view) of FIG. 3. FIG. 5 is a sectional view taken along line B-B in FIG. 2. FIG. 6 is a partially enlarged view (a partially enlarged sectional view) of FIG. 5. In the following explanation, the front side on the paper surface in FIG. 2 is referred to as "upper", the depth side on the paper surface is referred to as "lower", the right side is referred to as "right", and the left side is referred to as "left". In FIGS. 1 to 3 and 5, an X axis, a Y axis, and a Z axis are shown as three axes orthogonal to one another. In the following explanation, a direction parallel to the X axis (the left right direction) is referred to as "X axis direction", a direction parallel to the Y axis is referred to as "Y axis direction", and a direction parallel to the Z axis (the up down direction) is referred to as "Z axis direction". In FIGS. 1 to 3, 5, 7, and 8, for convenience of explanation, an insulating film 6 explained later and portions corresponding thereto (insulating films 106 and 106A) are not shown. In this embodiment, an example in which the functional device is used as a physical quantity sensor device for measuring physical quantities such as acceleration and angular velocity is explained.

Functional Device

A functional device 1 shown in FIG. 1 includes an insulating substrate 2, an element piece (a base) 3 bonded to and supported by the insulating substrate 2, a conductor pattern 4 electrically connected to the element piece 3, and a cover member 5 provided to cover the element piece 3.

Sections included in the functional device 1 are explained in detail below in order.

Insulating Substrate

The insulating substrate 2 has a function of supporting the element piece 3.

The insulating substrate 2 is formed in a plate shape. A hollow section 21 is provided in the upper surface (one surface) of the insulating substrate 2. In plan view of the insulating substrate 2, the hollow section 21 is formed to include a movable section 33, movable electrode sections 36 and 37, and coupling sections 34 and 35 of the element piece 3 explained later. The hollow section 21 has an inner bottom. Such a hollow section 21 forms a clearance section that prevents the movable section 33, the movable electrode sections 36 and 37, and the coupling sections 34 and 25 of the element piece 3 from coming into contact with the insulating substrate 2. Consequently, it is possible to allow displacement of the movable section 33 of the element piece 3.

Instead of the hollow section 21 (a recessed section), the clearance section may be an opening piercing through the insulating substrate 2 in the thickness direction thereof. In this embodiment, a plan view shape of the hollow section 21 is a square (specifically, a rectangle) but is not limited to this.

On the upper surface of the insulating substrate 2, recessed sections 22, 23, and 24 are provided on the outer side of the hollow section 21 along the outer periphery of the hollow section 21. The recessed sections 22, 23, and 24 are formed in a shape corresponding to the conductor pattern 4 in plan view. Specifically, the recessed section 22 is formed in a shape corresponding to a line 41 and an electrode 44 of the conductor pattern 4 explained later. The recessed section 23 is formed in a shape corresponding to a line 42 and an electrode 45 of the conductor pattern 4 explained later. The recessed section 24 is formed in a shape corresponding to a line 43 and an electrode 46 of the conductor pattern 4 explained later.

The depth of a region of the recessed section 22 where the electrode 44 is provided is larger than the depth of a region of the recessed section 22 where the line 41 is provided. Similarly, the depth of a region of the recessed section 23 where the electrode 45 is provided is larger than the depth of a region of the recessed section 23 where the line 42 is provided. The depth of a region of the recessed section 24 where the electrode 46 is provided is larger than the depth of a region of the recessed section 24 where the line 43 is provided.

In this way, the depth of a part of the recessed sections 22, 23, and 24 is increased. Consequently, during manufacturing of the functional device 1 explained later, when a substrate 103 before formation of the element piece 3 is bonded to a substrate 102A (see FIGS. 7A to 7E), it is possible to prevent the substrate 103 from being bonded to the electrodes 44, 45, and 46.

As the material of such an insulating substrate 2, specifically, it is desirable to use a silicon material or a glass material having high resistance. In particular, when the element piece 3 is formed using the silicon material as a main material, it is desirable to use a glass material containing an alkali metal ion (a movable ion) (e.g., borosilicate glass such as pyrex glass (registered trademark)). Consequently, when the element piece 3 is formed using silicon as a main material, it is possible to anodically bond the insulating substrate 2 and the element piece 3.

A thermal expansion coefficient difference between the material of the insulating substrate 2 and the material of the element piece 3 is desirably as small as possible. Specifically, the thermal expansion coefficient difference between the material of the insulating substrate 2 and the material of the element piece 3 is desirably equal to or smaller than 3 ppm/° C. Consequently, even if the insulating substrate 2 and the element piece 3 are exposed to high temperature during bonding thereof, it is possible to reduce residual stress between the insulating substrate 2 and the element piece 3.

Element Piece

The element piece 3 includes fixed sections 31 and 32, a movable section 33, coupling sections 34 and 35, movable electrode sections 36 and 37, and fixed electrode sections 38 and 39.

In such an element piece 3, the movable section 33 and the movable electrode sections 36 and 37 are displaced in the X axis direction (a +X direction or a −X direction) while elastically deforming the coupling sections 34 and 35, for example, according to changes in physical quantities such as acceleration and angular velocity. According to such displacement, the size of a gap between the movable electrode section 36 and the fixed electrode section 38 and the size of a gap between the movable electrode section 37 and the fixed electrode section 39 change. In other words, according to such displacement, the level of the capacitance between the variable electrode section 36 and the fixed electrode section 38 and the level of the capacitance between the movable electrode section 37 and the fixed electrode section 39 change. Therefore, it is possible to detect the physical quantities such as acceleration and angular velocity on the basis of the capacitances.

The fixed sections 31 and 32, the movable section 33, the coupling sections 34 and 35, and the movable electrode sections 36 and 37 are integrally formed.

The fixed sections 31 and 32 are bonded to the upper surface of the insulating substrate 2. Specifically, the fixed section 31 is bonded to a section on the −X direction side (the left side in the figure) with respect to the hollow section 21 in the upper surface of the insulating substrate 2. The fixed section 32 is bonded to a section on the +X direction side (the right side in the figure) with respect to the hollow section 21 in the upper surface of the insulating substrate 2. The fixed sections 31 and 32 are provided to cross the outer peripheral edge of the hollow section 21 in plan view.

The positions, the shapes, and the like of the fixed sections 31 and 32 are determined according to the positions, the shapes, and the like of the coupling sections 34 and 35, the conductor pattern 4, and the like and are not limited to those explained above.

The movable section 33 is provided between such two fixed sections 31 and 32. In this embodiment, the movable section 33 is formed in a longitudinal shape extending in the X axis direction. The shape of the movable section 33 is determined according to the shapes, the sizes, and the like of the sections included in the element piece 3 and is not limited to that explained above.

Such a movable section 33 is coupled to the fixed section 31 via the coupling section 34 and coupled to the fixed section 32 via the coupling section 35. More specifically, an end on the left side of the movable section 33 is coupled to the fixed section 31 via the coupling section 34 and an end on the right side of the movable section 33 is coupled to the fixed section 32 via the coupling section 35.

The coupling sections 34 and 35 displaceably couple the movable section 33 to the fixed sections 31 and 32. In this embodiment, the coupling sections 34 and 35 are configured to be capable of displacing the movable section 33 in the X axis direction (the +X direction or the −X direction) as indicated by an arrow "a" in FIG. 2.

Specifically, the coupling section 34 includes two beams 341 and 342. The beams 341 and 342 are formed in a shape extending in the X axis direction while meandering in the Y axis direction. In other words, the beams 341 and 342 are formed in a shape folded back in the Y axis direction plural times (in this embodiment, three times). The number of times of folding-back of the beams 341 and 342 may be once or twice or may be four or more times.

Similarly, the coupling section 35 includes two beams 351 and 352 formed in a shape extending in the X axis direction while meandering in the Y axis direction.

The coupling sections 34 and 35 are not limited to those explained above as long as the coupling sections 34 and 35 support the movable section 33 displaceably with respect to the insulating substrate 2. For example, the coupling sections 34 and 35 may include a pair of beams respectively extending in a +Y direction and a −Y direction from both ends of the movable section 33.

The movable electrode section 36 is provided on one side (the +Y direction side) in the width direction of the movable section 33 displaceably supported in the X axis direction with respect to the insulating substrate 2 in this way. The movable electrode section 37 is provided on the other side (the −Y direction side).

The movable electrode section 36 includes plural movable electrode fingers 361 to 365 projecting in the +Y direction from the movable section 33 and arranged to be formed in a comb teeth shape. The movable electrode fingers 361, 362, 363, 364, and 365 are arranged in this order from the −X direction side to the +X direction side. Similarly, the movable electrode section 37 includes plural movable electrode fingers 371 to 375 projecting in the −Y direction from the movable section 33 and arranged to be formed in a comb teeth shape. The movable electrode fingers 371, 372, 373, 374, and 375 are arranged in this order from the −X direction side to the +X direction side.

The plural movable electrode fingers 361 to 365 and the plural movable electrode fingers 371 to 375 are provided to be arranged in a direction in which the movable section 33 is displaced (i.e., the Y axis direction). Consequently, it is possible to efficiently change the capacitance between fixed electrode fingers 382, 384, 386, and 388 explained later and the movable electrode section 36 and the capacitance between fixed electrode fingers 381, 383, 385, and 387 explained later and the movable electrode section 36 according to the displacement of the movable section 33. Similarly, it is possible to efficiently change the capacitance between fixed electrode fingers 392, 394, 396, and 398 explained later and the movable electrode section 36 and the capacitance between fixed electrode fingers 391, 393, 395, and 397 explained later and the movable electrode section 36 according to the displacement of the movable section 33. Therefore, when the functional device 1 is used as a physical quantity sensor, it is possible to make detection accuracy excellent.

Such a movable electrode section 36 is spaced apart from and opposed to the fixed electrode section 38. The movable electrode section 37 is spaced apart from and opposed to the fixed electrode section 39.

The fixed electrode section 38 includes plural fixed electrode fingers 381 to 388 arranged to be formed in a comb teeth shape that are spaced apart from and mesh with the plural movable electrode fingers 361 to 365 of the movable electrode section 36. Ends of such plural fixed electrode fingers 381 to 388 on the opposite side of the movable section 33 are respectively bonded to portions on the +Y direction side with respect to the hollow section 21 in the upper surface of the insulating substrate 2. Ends on a fixed side of the fixed electrode fingers 381 to 388 are fixed ends. Free ends of the fixed electrode fingers 381 to 388 extend in the −Y direction.

The fixed electrode fingers 381, 382, 383, 384, 385, 386, 387, and 388 are arranged in this order from the −X direction side to the +X direction side. The fixed electrode fingers 381 and 382 form a pair and are provided between the movable electrode fingers 361 and 362 to face the movable electrode fingers 361 and 362. The fixed electrode fingers 383 and 384 form a pair and are provided between the movable electrode fingers 362 and 363 to face the movable electrode fingers 362 and 363. The fixed electrode fingers 385 and 386 form a pair and are provided between the movable electrode fingers 363 and 364 to face the movable electrode fingers 363 and 364. The fixed electrode fingers 387 and 388 form a pair and are provided between the movable electrode fingers 364 and 365 to face the movable electrode fingers 364 and 365.

The fixed electrode fingers 382, 384, 386, and 388 are respectively first fixed electrode fingers. The fixed electrode fingers 381, 383, 385, and 387 are respectively second fixed electrode fingers spaced apart from the first fixed electrode fingers via gaps on the insulating substrate 2. In this way, the plural fixed electrode fingers 381 to 388 include the plural first fixed electrode fingers and the plural second fixed electrode fingers that are alternately arranged. In other words, the first fixed electrode fingers are arranged on one side of the movable electrode fingers and the second fixed electrode fingers are arranged on the other side.

The first fixed electrode fingers 382, 384, 386, and 388 and the second fixed electrode fingers 381, 383, 385, and 387 are separated from each other on the insulating substrate 2. In other words, the first fixed electrode fingers 382, 384, 386, and 388 and the second fixed electrode fingers 381, 383, 385, and 387 are not coupled to each other on the insulating substrate 2 and are isolated in an island shape. Consequently, it is possible to electrically insulate the first fixed electrode fingers 382, 384, 386, and 388 and the second fixed electrode fingers 381, 383, 385, and 387. Therefore, it is possible to separately measure the capacitance between the first fixed electrode fingers 382, 384, 386, and 388 and the movable electrode section 36 and the capacitance between the second fixed electrode fingers 381, 383, 385, and 387 and the movable electrode section 36 and detect physical quantities at high accuracy on the basis of results of the measurement.

In this embodiment, the fixed electrode fingers 381 to 388 are separated from each other on the insulating substrate 2. In other words, the fixed electrode fingers 381 to 388 are not coupled to one another on the insulating substrate 2 and are isolated in an island shape. Consequently, it is possible to align the lengths in the Y axis direction of the fixed electrode fingers 381 to 388. Therefore, it is possible to realize a reduction in size of the fixed electrode fingers 381 to 388 while securing an area necessary for obtaining sufficient bonding strength in bonding sections between the fixed electrode fingers 381 to 388 and the insulating substrate 2. Therefore, it is possible to realize a reduction in size of the functional device 1 while making the functional device 1 excellent in shock resistance.

Similarly, the fixed electrode section 39 includes plural fixed electrode fingers 391 to 398 arranged to be formed in a comb teeth shape that are spaced apart from and mesh with the plural movable electrode fingers 371 to 375 of the movable electrode section 37. Ends of such plural fixed electrode fingers 391 to 398 on the opposite side of the movable section 33 are respectively bonded to portions on the −Y direction side with respect to the hollow section 21 in the upper surface of the insulating substrate 2. Ends on a fixed side of the fixed electrode fingers 391 to 398 are fixed ends. Free ends of the fixed electrode fingers 391 to 398 extend in the +Y direction.

The fixed electrode fingers 391, 392, 393, 394, 395, 396, 397, and 398 are arranged in this order from the −X direction side to the +X direction side. The fixed electrode fingers 391 and 392 form a pair and are provided between the movable electrode fingers 371 and 372 to face the movable electrode fingers 371 and 372. The fixed electrode fingers 393 and 394 form a pair and are provided between the movable electrode fingers 372 and 373 to face the movable electrode fingers 372 and 373. The fixed electrode fingers 395 and 396 form a pair and are provided between the movable electrode fingers 373 and 374 to face the movable electrode fingers 373 and 374. The fixed electrode fingers 397 and 398 form a pair and are provided between the movable electrode fingers 374 and 375 to face the movable electrode fingers 374 and 375.

The fixed electrode fingers 392, 394, 396, and 398 are respectively first fixed electrode fingers. The fixed electrode fingers 391, 393, 395, and 397 are respectively second fixed electrode fingers spaced apart from the first fixed electrode fingers via gaps on the insulating substrate 2. In this way, the plural fixed electrode fingers 391 to 398 include the plural first fixed electrode fingers and the plural second fixed electrode fingers that are alternately arranged. In other words, the first fixed electrode fingers are arranged on one side of the movable electrode fingers and the second fixed electrode fingers are arranged on the other side.

As in the fixed electrode section 38, the first fixed electrode fingers 392, 394, 396, and 398 and the second fixed electrode fingers 391, 393, 395, and 397 are separated from each other on the insulating substrate 2. Consequently, it is possible to separately measure the capacitance between the first fixed electrode fingers 392, 394, 396, and 398 and the movable electrode section 37 and the capacitance between the second fixed electrode fingers 391, 393, 395, and 397 and the movable electrode section 37 and detect physical quantities at high accuracy on the basis of results of the measurement.

In this embodiment, as in the fixed electrode section 38, the plural fixed electrode fingers 391 to 398 are separated from each other on the insulating substrate 2. Consequently, it is possible to realize a reduction in size of the fixed electrode fingers 391 to 398 while securing a sufficient area of bonding sections between the fixed electrode fingers 391 to 398 and the insulating substrate 2. Therefore, it is possible to realize a reduction in size of the functional device 1 while making the functional device 1 excellent in shock resistance.

Such an element piece 3 (i.e., the fixed sections 31 and 32, the movable section 33, the coupling sections 34 and 35, the plural fixed electrode fingers 381 to 388 and 391 to 398, and the plural movable electrode fingers 361 to 365 and 371 to 375) is formed by etching one substrate 103 explained later.

Consequently, it is possible to increase the thicknesses of the fixed sections 31 and 32, the movable section 33, the coupling sections 34 and 35, the plural fixed electrode fingers 381 to 388 and 391 to 398, and the plural movable electrode fingers 361 to 365 and 371 to 375. It is possible to simply and highly accurately align the thicknesses. Therefore, it is possible to realize an increase in sensitivity of the functional device 1 and improve shock resistance of the functional device 1.

The material of the element piece 3 is not specifically limited as long as detection of physical quantities based on the change in the capacitance is possible. However, a semiconductor is desirable. Specifically, it is desirable to use a silicon material such as monocrystal silicon or polysilicon.

Specifically, the fixed sections 31 and 32, the movable section 33, the coupling sections 34 and 35, the plural fixed electrode fingers 381 to 388 and 391 to 398, and the plural movable electrode fingers 361 to 365 and 371 to 375 are desirably formed using silicon as a main material.

Silicon can be highly accurately processed by etching. Therefore, it is possible to make dimension accuracy of the element piece 3 excellent by forming the element piece 3 using silicon as a main material. As a result, it is possible to realize an increase in sensitivity of the functional device 1, which is a physical quantity sensor element. Since silicon is fatigued little, it is also possible to improve durability of the functional device 1.

Impurities such as phosphor and boron are desirably doped in the silicon material included in the element piece 3. Consequently, it is possible to make electrical conductivity of the element piece 3 excellent.

As explained above, the fixed sections 31 and 32 and the fixed electrode sections 38 and 39 are bonded to the upper surface of the insulating substrate 2 as explained above, whereby the element piece 3 is supported by the insulating substrate 2. In this embodiment, the insulating substrate 2 and the element piece 3 are bonded via the insulating film 6 explained later.

A method of bonding the element piece 3 (specifically, the fixed sections 31 and 32 and the fixed electrode fingers 381 to 388 and 391 to 398) and the insulating substrate 2 is not specifically limited. However, it is desirable to use an anode bonding method. Consequently, it is possible to firmly bond the fixed sections 31 and 32 and the fixed electrode sections 38 and 39 (the fixed electrode fingers 381 to 388 and 391 to 398) to the insulating substrate 2. Therefore, it is possible to improve the shock resistance of the functional device 1. It is possible to highly accurately bond the fixed sections 31 and 32 and the fixed electrode sections 38 and 39 (the fixed electrode fingers 381 to 388 and 391 to 398) to desired positions of the insulating substrate 2. Therefore, it is possible to realize an increase in sensitivity of the functional device 1, which is a physical quantity sensor element. In this case, the element piece 3 is formed using silicon as the main material and the insulating substrate 2 is formed of a glass material containing an alkali metal ion.

Conductor Pattern

The conductor pattern 4 is provided on the upper surface (the surface on the fixed electrodes 38 and 39 side) of the insulating substrate 2.

The conductor pattern 4 includes the lines 41, 42, and 43 and the electrodes 44, 45, and 46.

The line 41 is provided on the outer side of the hollow section 21 of the insulating substrate 2 and formed along the outer periphery of the hollow section 21. One end of the line 41 is connected to the electrode 44 on the outer peripheral section of the upper surface of the insulating substrate 2 (a section on the outer side of the cover member 5 on the insulating substrate 2).

Such a line 41 is electrically connected to the fixed electrode fingers 382, 384, 386, and 388 and the fixed electrode fingers 392, 394, 396, and 398, which are the first fixed electrode fingers, of the element piece 3. The line 41 is a first line electrically connected to the first fixed electrode fingers.

The line 42 is provided on the inner side of the line 41 and the outer side of the hollow section 21 of the insulating substrate 2 along the outer peripheral edge of the hollow section 21. One end of the line 42 is connected to the electrode 45 on the outer peripheral section of the upper surface of the insulating substrate 2 (the section on the outer side of the cover member 5 on the insulating substrate 2) such that the one end is arranged to be spaced apart from the electrode 44.

The line 43 is provided to extend onto the outer peripheral section of the upper surface of the insulating substrate 2 (the section on the outer side of the cover member 5 on the insulating substrate 2) from a bonding section with the fixed section 31 on the insulating substrate 2. An end of the line 43 on the opposite side of the fixed section 31 is connected to the electrode 46 on the outer peripheral section of the upper surface of the insulating substrate 2 (the section on the outer side of the cover member 5 on the insulating substrate 2) such that the end is arranged to be spaced apart from the electrodes 44 and 45.

The material of such lines 41 to 43 is not specifically limited as long as the material has electrical conductivity. Various electrode materials can be used. Examples of the material include oxides (transparent electrode materials) such as ITO (Indium Tin Oxide), IZO (Indium Zinc Oxide), $In_3O_3$, $SnO_2$, $SnO_2$ containing Sb, and ZnO containing Al, metal such as Au, Pt, Ag, Cu, and Al, and alloys containing these kinds of metal. One of materials among these materials can be used or two or more kinds of materials among these materials can be used in combination.

Among these materials, it is desirable to use the transparent electrode materials (in particular, ITO) as the material of the lines 41 to 43. When the lines 41 and 42 are respectively formed of the transparent electrode materials, if the insulating substrate 2 is a transparent substrate, foreign matters or the like present on the surface of the insulating substrate 2 on the fixed electrode sections 38 and 39 side can be easily visually recognized from the surface side of the insulating substrate 2 opposite to the fixed electrode sections 38 and 39. Therefore, it is possible to more surely provide the functional device 1 as a highly sensitive physical quantity sensor device.

Like the material of the lines 41 to 43, the material of the electrodes 44 to 46 is not specifically limited as long as the material has electrical conductivity. Various electrode materials can be used. In this embodiment, as the material of the electrodes 44 to 46, a material same as the material of protrusions 471, 472, 481, and 482 explained later is used.

Such lines 41 and 42 (the first line and the second line) are provided on the upper surface of the insulating substrate 2. Consequently, it is possible to measure, via the line 41, the capacitance between the first fixed electrode fingers 382, 384, 386, and 388 and the movable electrode section 36 and the capacitance between the first fixed electrode fingers 392, 394, 396, and 398 and the movable electrode section 37 and measure, via the line 42, the capacitance between the second fixed electrode fingers 381, 383, 385, and 387 and the movable electrode section 36 and the capacitance between the second fixed electrode fingers 391, 393, 395, and 397 and the movable electrode section 37.

In this embodiment, by using the electrode 44 and the electrode 46, it is possible to measure the capacitance between the first fixed electrode fingers 382, 384, 386, and 388 and the movable electrode section 36 and the capacitance between the first fixed electrode fingers 392, 394, 396, and 398 and the movable electrode section 37. By using the electrode 45 and the electrode 46, it is possible to measure the capacitance between the second fixed electrode fingers 381, 383, 385, and 387 and the movable electrode section 36 and the capacitance between the second fixed electrode fingers 391, 393, 395, and 397 and the movable electrode section 37.

Since such lines 41 and 42 are provided on the upper surface (i.e., the surface on the fixed electrode sections 38 and 39 side) of the insulating substrate 2, it is easy to electrically connect the lines 41 and 42 to the fixed electrode sections 38 and 39 and position the lines 41 and 42. Therefore, it is possible to improve reliability (in particular, shock resistance and detection accuracy) of the functional device 1.

The line 41 and the electrode 44 are provided in the recessed section (a first recessed section) 22 of the insulating substrate 2, the line 42 and the electrode 45 are provided in the recessed section (a second recessed section) 23 of the insulating substrate 2, and the line 43 and the electrode 46 are provided in the recessed section (a third recessed section) 24 of the insulating substrate 2. Consequently, it is possible to prevent the lines 41 to 43 from projecting from the plate surface of the insulating substrate 2. Therefore, it is possible to electrically connect the fixed electrode fingers 382, 384, 386, 388, 392, 394, 396, and 398 and the line 41 and electrically connect the fixed electrode fingers 381, 383, 385, 387, 391, 393, 395, 397 and the line 42 while ensuring bonding (fixing) of the fixed electrode fingers 381 to 388 and 391 to 398 and the insulating substrate 2. Similarly, it is possible to electrically connect the fixed section 31 and the line 43 while ensuring bonding (fixing) of the fixed section 31 and the insulating substrate 2. When the thickness of the lines 41 to 43 is represented as t and the depth of portions of the recessed sections 22 to 24 where the line 41 is provided is represented as d, a relation t<d is satisfied.

In particular, on the line 41, which is the first line, plural protrusions 481 and plural protrusions 482, which are first protrusions, having electrical conductivity are provided. The plural protrusions 481 are provided to correspond to the plural fixed electrode fingers 382, 384, 386, and 388, which are the first fixed electrode fingers. The plural protrusions 482 are provided to correspond to the plural fixed electrode fingers 392, 394, 396, and 398, which are the first fixed electrode fingers.

The fixed electrode fingers 382, 384, 386, and 388 and the line 41 are electrically connected via the plural protrusions 481. The fixed electrode fingers 392, 394, 396, and 398 and the line 41 are electrically connected via the plural protrusions 482.

Consequently, it is possible to electrically connect the fixed electrode fingers 382, 384, 386, 388, 392, 394, 396, and 398 and the line 41 while preventing an unintended electrical connection (short circuit) of the line 41 and other regions.

Similarly, on the line 42, which is the second line, plural protrusions 471 and plural protrusions 472, which are second protrusions, having electrical conductivity are provided. The plural protrusions 471 are provided to correspond to the plural fixed electrode fingers 381, 383, 385, and 387, which are the second fixed electrode fingers. The plural protrusions 472 are provided to correspond to the plural fixed electrode fingers 391, 393, 395, and 397, which are the second fixed electrode fingers.

The fixed electrode fingers 381, 383, 385, and 387 and the line 42 are electrically connected via the plural protrusions 471. The fixed electrode fingers 391, 393, 395, and 397 and the line 42 are electrically connected via the plural protrusions 472.

Consequently, it is possible to electrically connect the fixed electrode fingers 381, 383, 385, 387, 391, 393, 395, and 397 and the line 42 while preventing an unintended electrical connection (short circuit) of the line 42 and other regions.

The material of such protrusions 471, 472, 481, and 482 is not specifically limited as long as the material has electrical conductivity. Various electrode materials can be used. However, for example, metal such as single metal of Au, Pt, Ag, Cu, Al, or the like or an alloy containing these kinds of metals is suitably used. By forming the protrusions 471, 472, 481, and 482 using such metal, it is possible to reduce the contact resistance between the lines 41 and 42 and the fixed electrode sections 38 and 39.

When the thickness of the lines 41 to 43 is represented as t, the depth of portions of the recessed sections 22 to 24 where the line 41 is provided is represented as d, and the height of the protrusions 471, 472, 481, and 482 is represented as h, a relation d≡t+h is satisfied.

As shown in FIGS. 4 and 6, the insulating film 6 is provided on the lines 41 to 43. The insulating film 6 is not formed on the protrusions 471, 472, 481, and 482 and a protrusion 50 and the surfaces of the protrusions are exposed. The insulating film 6 has a function of preventing an unintended electrical connection (short circuit) of the conductor pattern 4 and the element piece 3. Consequently, it is possible to electrically connect the first fixed electrode fingers 382, 384, 386, 388, 392, 394, 396, and 398 and the line 41 and electrically connect the second fixed electrode fingers 381, 383, 385, 387, 391, 393, 395, and 397 and the line 42 while more surely preventing an unintended electrical connection (short circuit) of the lines 41 and 42 and other regions. It is possible to electrically connect the fixed section 31 and the line 43 while more surely preventing an unintended electrical connection (short circuit) of the line 43 and other regions.

In this embodiment, the insulating film 6 is formed over the entire region of the upper surface of the insulating substrate 2 excluding formation regions of the protrusions 471, 472, 481, 482, and 50 and the electrodes 44 to 46 explained later. The formation region of the insulating film 6 is not limited to this as long as the insulating film 6 can cover the lines 41 to 43. For example, the insulating film 6 may be formed in a shape excluding a bonding section between the upper surface of the insulating substrate 2 and the element piece 3 and a bonding section between the upper surface of the insulating substrate 2 and the cover member 5.

When the thickness of the lines 41 to 43 is represented as t and the depth of portions of the recessed sections 22 to 24 where the line 41 is provided is represented as d, a relation d>t is satisfied. Consequently, for example, as shown in FIG. 4, a gap 221 is formed between the fixed electrode finger 391 and the line 41. Although not shown in the figure, gaps same as the gap 221 are formed between the other fixed electrode fingers and the insulating film 6 on the lines 41 and 42. Such gaps are also formed between the substrate 102 and the substrate 103 in manufacturing of the functional device 1 explained later. Gas generated during anode bonding can be discharged through the gaps.

As shown in FIG. 6, a gap 222 is formed between the cover member 5 and the insulating film 6 on the line 43. Although not shown in the figure, gaps same as the gap 222 are also formed between the cover member 5 and the insulating film 6 on the lines 41 and 42. These gaps can be used for decompressing the inside of the cover member 5 and filling an inert gas. The gaps may be closed by an adhesive when the cover member 5 and the insulating substrate 2 are bonded by the adhesive.

The material of such an insulating film 6 is not specifically limited. Various materials having insulating properties can be used. However, when the insulating substrate 2 is formed of a glass material (in particular, a glass material added with an alkali metal ion), it is desirable to use silicon dioxide ($SiO_2$). Consequently, it is possible to prevent an unintended electrical connection. Even if the insulating film 6 is present in the bonding section between the upper surface of the insulating substrate 2 and the element piece 3, it is possible to anodically bond the insulating substrate 2 and the element piece 3.

The thickness (average thickness) of the insulating film 6 is not specifically limited. However, the thickness is desirably about 10 to 1000 nm and more desirably about 10 to 200 nm. When the insulating film 6 is formed in such a range of the thickness, it is possible to prevent an unintended electrical connection mentioned before. When the insulating substrate 2 is formed of a glass material containing an alkali metal ion and the element piece 3 is formed using silicon as a main material, even if the insulating film 6 is present in the bonding section between the upper surface of the insulating substrate 2 and the element piece 3, it is possible to anodically bond the insulating substrate 2 and the element piece 3 via the insulating film 6.

Cover Member

The cover member 5 has a function of protecting the element piece 3.

The cover member 5 is formed in a tabular shape. A recessed section 51 is provided in one surface (the lower surface) of the cover member 5. The recessed section 51 is formed to allow displacement of the movable section 33, the movable electrode sections 36 and 37, and the like of the element piece 3.

A portion of the lower surface of the cover member 5 further on the outer side than the recessed section 51 is bonded to the upper surface of the insulating substrate 2. In this embodiment, the insulating substrate 2 and the cover member 5 are bonded via the insulating film 6.

A method of bonding the cover member 5 and the insulating substrate 2 is not specifically limited. For example, a bonding method by an adhesive, an anode bonding method, a direct bonding method, and the like can be used.

The material of the cover member 5 is not specifically limited as long as the material can display the functions explained above. However, a silicon material, a glass material, and the like can be suitably used.

Method of Manufacturing a Functional Device

A method of manufacturing a functional device according to the embodiment is explained. An example of a method of manufacturing the functional device 1 is explained below.

FIGS. 7A to 7E and FIGS. 8A to 8C are respectively diagrams for explaining a method of manufacturing the functional device shown in FIG. 1. FIGS. 9A to 9D are diagrams for explaining a step shown in FIG. 7C (a step for forming lines, contacts, and an insulating film). A section corresponding to a section taken along line A-A in FIG. 1 is shown in FIGS. 7A to 7E and FIGS. 8A to 8C.

In an example explained below, the insulating substrate 2 is formed of a glass material containing an alkali metal ion and the element piece 3 is formed of silicon.

Figure 7A:
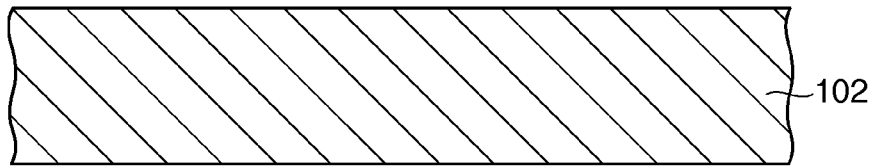
FIGS. 7A to 7E are diagrams for explaining a method of manufacturing the functional device shown in FIG. 1.

[1] First, as shown in FIG. 7A, the substrate 102, which is a first substrate, is prepared. The substrate 102 changes to the insulating substrate 2 through steps explained later. The substrate 102 is formed of a glass material containing alkali metal.

Figure 7B:
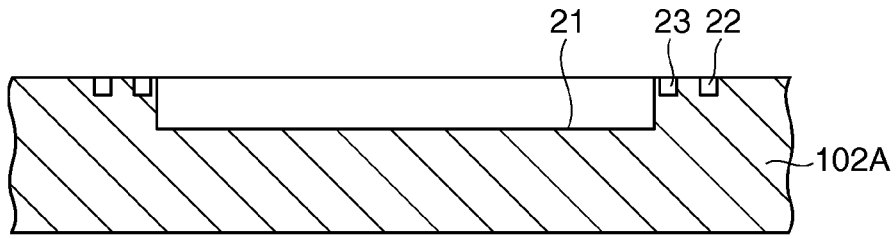

[2] Subsequently, as shown in FIG. 7B, the upper surface of the substrate 102 is etched to form the hollow section 21 and the recessed sections 22 and 23. At this point, although not shown in FIG. 7B, the recessed section 24 is simultaneously formed by the etching. Consequently, the substrate 102A in which the hollow section 21 and the recessed sections 22 to 24 are formed is obtained.

A method of forming the hollow section 21 and the recessed sections 22 to 24 (an etching method) is not specifically limited. However, for example, one kind among physical etching methods such as plasma etching, reactive ion etching, beam etching, and light assist etching and chemical etching methods such as wet etching can be used or two or more kinds of the methods can be used in combination. The same method can be used in etching in the following steps.

In the etching, for example, a mask formed by a photolithography method can be suitably used. The hollow section 21 and the recessed sections 22 to 24 can be formed in order by repeating mask formation, etching, and mask removal plural times. The mask is removed after the etching. As a method of removing the mask, for example, when the mask is formed of a resist material, resist peeling liquid can be used. When the mask is formed of a metal material, metal peeling liquid or the like such as a phosphoric acid solution can be used.

The hollow section 21 and the recessed sections 22 to 24 (plural recessed sections having different depths) may be collectively formed by using, for example, a gray scale mask as the mask.

Figure 7C:
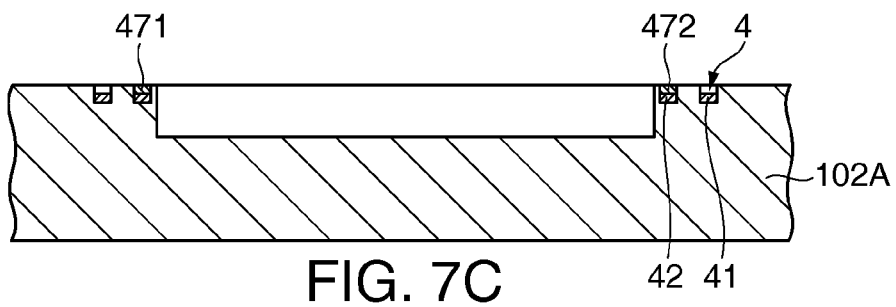

[3] As shown in FIG. 7C, the conductor pattern 4 is formed on the upper surface of the substrate 102A. Thereafter, although not shown in FIG. 7C, the insulating film 106A is formed. The insulating film 106A changes to the insulating film 6 through singulation explained later.

The formation of the conductor pattern 4 and the insulating film 106A is explained in detail below with reference to FIGS. 9A to 9D. In FIGS. 9A to 9D, the formation of the conductor pattern 4 and the insulating film 106A near a bonding section between the substrate 102A and the fixed electrode finger 391 is representatively shown.

When the conductor pattern 4 is formed, first, as shown in FIG. 9A, the line 41 is formed in the recessed section 22 and the line 42 is formed in the recessed section 23. At this point, although not shown in FIG. 9A, the line 43 is formed in the recessed section 24 simultaneously with the formation of the lines 41 and 42.

A method of forming the lines 41, 42, and 43 (a film formation method) is not specifically limited. Examples of the method include vacuum evaporation, sputtering (low-temperature sputtering), dry plating methods such as ion plating, wet plating methods such as electrolytic plating and electroless plating, a spraying method, and bonding of a thin film. In film formation in the following steps, the same method can be used.

As shown in FIG. 9B, plural protrusions 472 are formed on the line 42 (film formation). At this point, although not shown in FIG. 9B, plural protrusions 471 and the electrode 45 are formed on the line 42 simultaneously with the formation of the protrusions 472. Plural protrusions 481, plural protrusions 482, and the electrode 44 are formed on the line 41 simultaneously with the formation of the protrusions 472. The protrusion 50 and the electrode 46 are formed on the line 43 simultaneously with the formation of the protrusions 472.

As shown in FIG. 9C, the insulating film 106 is formed on the upper surface of the substrate 102A (film formation) to cover the lines 41 and 42 and the like.

As shown in FIG. 9D, portions of the insulating film 106 corresponding to the protrusions 472 are removed. Although not shown in FIG. 9D, portions of the insulating film 106 corresponding to the protrusions 471, the protrusion 50, and the electrodes 44 to 46 are also removed. Consequently, the insulating film 106A on which the electrodes 44 to 46 are exposed and through which the protrusions 471, 472, and 50 pierce is obtained.

As explained above, the conductor pattern 4 and the insulating film 106A are obtained.

Figure 7D:
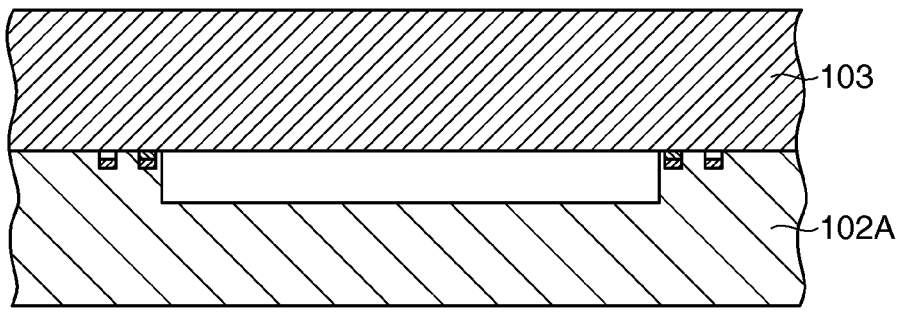

[4] As shown in FIG. 7D, the substrate 103, which is the second substrate, is bonded to the upper surface of the substrate 102A by the anode bonding method. Consequently, the substrate 103 and the protrusions 471, 472, and 50 are connected.

The substrate 103 changes to the element piece 3 through thinning, patterning, and singulation explained later. The substrate 103 is a silicon substrate.

The thickness of the substrate 103 is larger than the thickness of the element piece 3. Consequently, it is possible to improve handleability of the substrate 103. The thickness of the substrate 103 may be the same as the thickness of the element piece 3. In this case, a thinning step [5] explained later only has to be omitted.

Figure 7E:
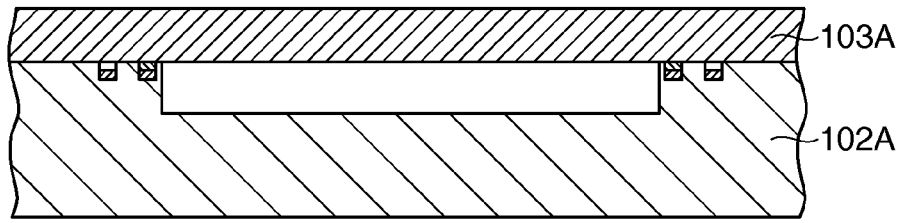

[5] The substrate 103 is thinned to obtain the substrate 103A as shown in FIG. 7E. The thinning is performed to reduce the thickness of the substrate 103A to be the same as the thickness of the element piece 3.

A method of thinning the substrate 103 is not specifically limited. For example, a CMP method or a dry polish method can be suitably used.

Figure 8A:
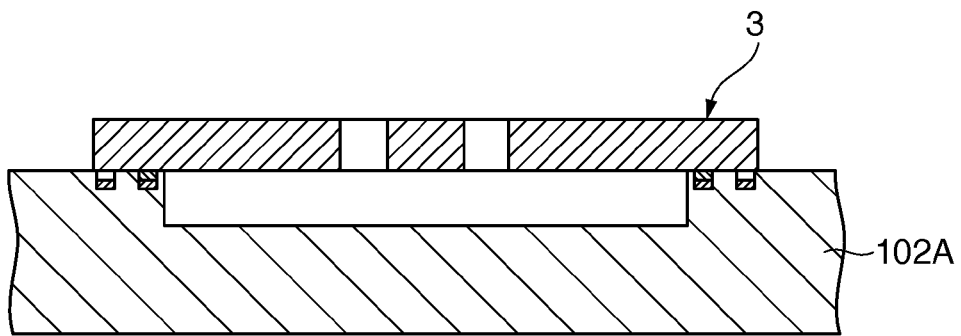
FIGS. 8A to 8C are diagrams for explaining the method of manufacturing the functional device shown in FIG. 1.

[6] The substrate 103A is etched to obtain the element piece 3 as shown in FIG. 8A.

Figure 8B:
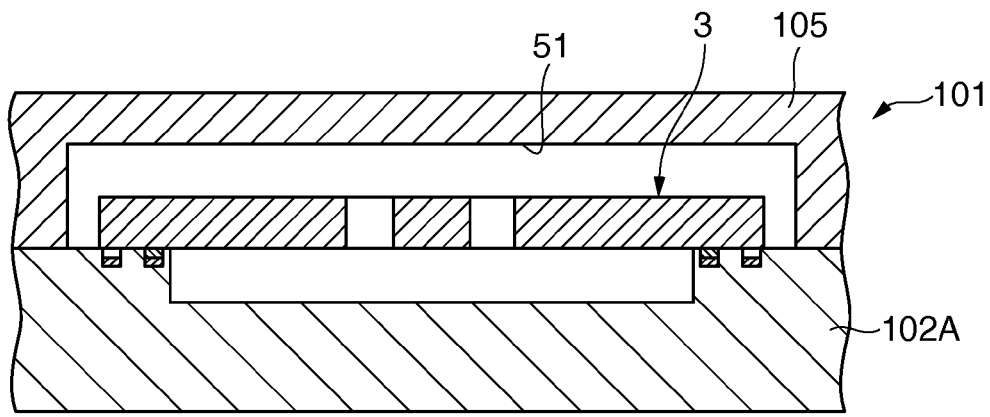

[7] As shown in FIG. 8B, the cover member 105 having the recessed section 51 is bonded to the upper surface of the substrate 102A. Consequently, a bonded body 101 in which the substrate 102A and the cover member 105 are bonded to store the element piece 103 is obtained.

The cover member 105 changes to the cover member 5 through singulation explained later.

Figure 8C:
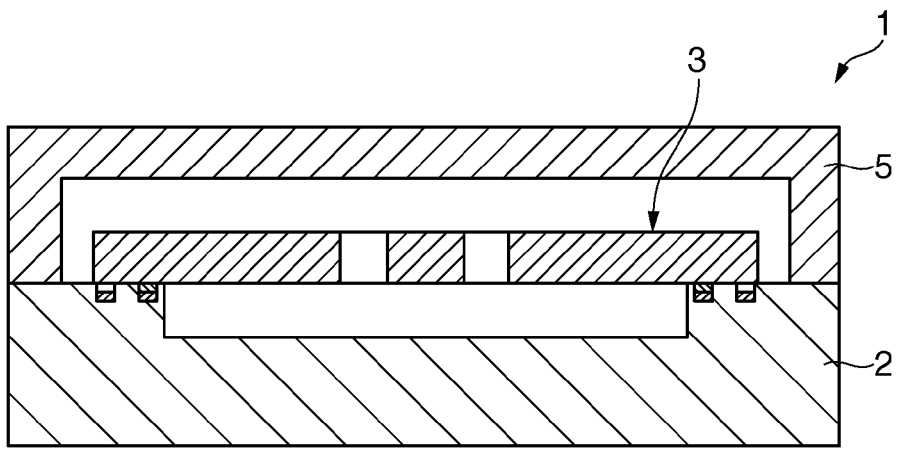

[8] As shown in FIG. 8C, the functional device 1 is obtained by singulating (dicing) the bonded body 101.

In the functional device 1 according to the first embodiment explained above, the plural first fixed electrode fingers (the fixed electrode fingers 382, 384, 386, 388, 392, 394, 396, and 398) and the plural second fixed electrode fingers (the fixed electrode fingers 381, 383, 385, 387, 391, 393, 395, and 397) are electrically insulated from each other. Therefore, it is possible to separately measure the capacitance between the first fixed electrode fingers and the movable electrode sections 36 and 37 and the capacitance between the second fixed electrode fingers and the movable electrode sections 36 and 37 and highly accurately detect physical quantities on the basis of results of the measurement.

The fixed sections 31 and 32, the movable section 33, the coupling sections 34 and 35, the plural fixed electrode fingers 381 to 388 and 391 to 398, and the plural movable electrode fingers 361 to 365 and 371 to 375 can be formed (in particular, collectively formed) from a substrate separate from the insulating substrate 2. Therefore, it is possible to increase the thickness of the movable electrode fingers and the fixed electrode fingers to realize an increase in sensitivity of the functional device 1. Further, it is possible to increase the thicknesses of the fixed sections 31 and 32, the movable section 33, and the coupling sections 34 and 35 to make the functional device 1 excellent in shock resistance.

Second Embodiment

Figure 10:
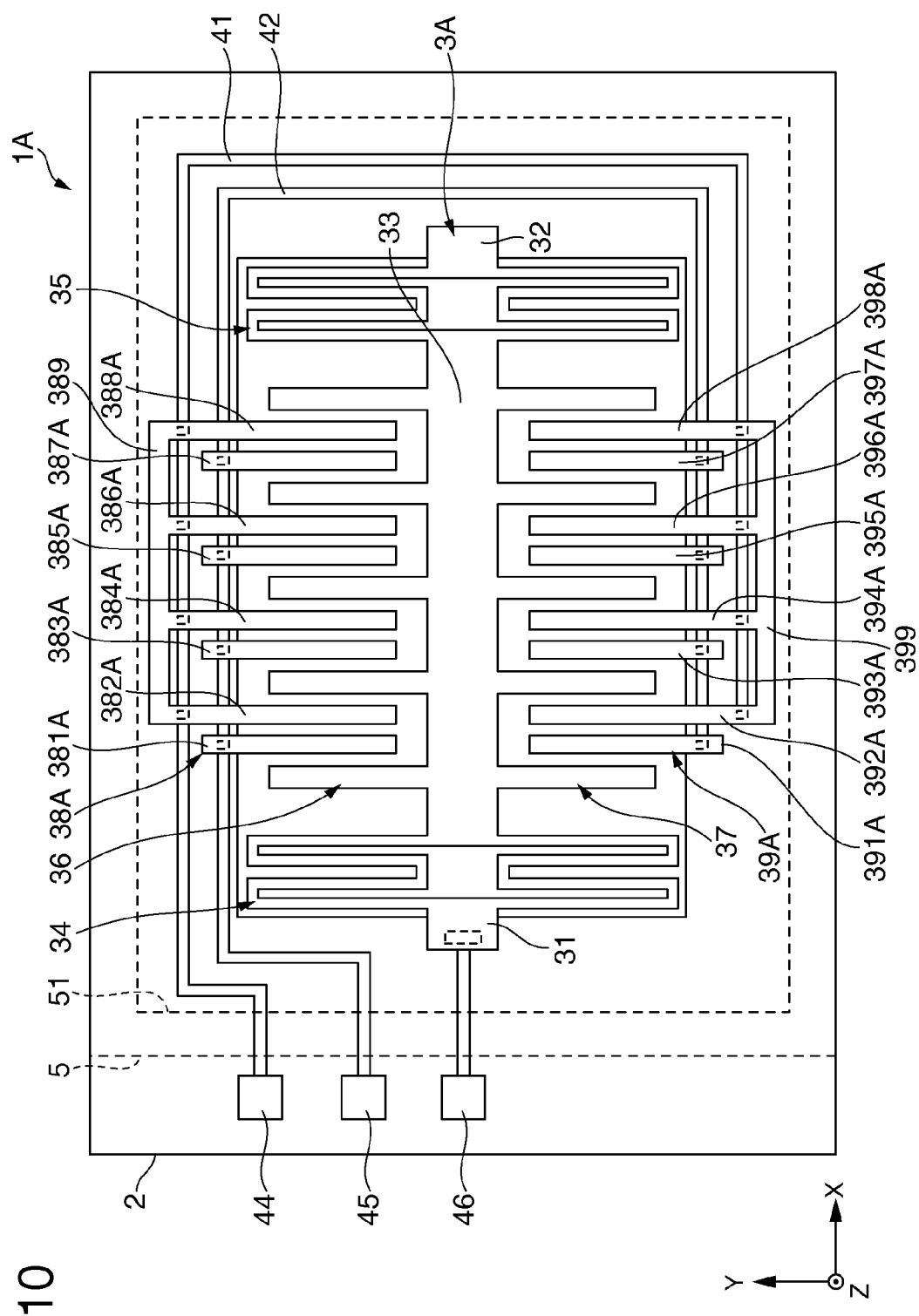
FIG. 10 is a plan view showing a functional device according to a second embodiment of the invention.

A functional device according to a second embodiment of the invention is explained below. FIG. 10 is a plan view showing the functional device according to the second embodiment of the invention.

The functional device according to this embodiment is the same as the functional device according to the first embodiment except that the configuration of fixed electrode sections is different.

In the following explanation, concerning the functional device according to the second embodiment, differences from the first embodiment are mainly explained. Explanation of matters same as those in the first embodiment is omitted. In FIG. 10, components same as those in the first embodiment are denoted by the same reference numerals and signs.

In a functional device 1A according to this embodiment, an element piece 3A is bonded to the upper surface of the insulating substrate 2.

The element piece 3A includes the fixed sections 31 and 32, the movable section 33, the coupling sections 34 and 35, the movable electrode sections 36 and 37, and fixed electrode sections 38A and 39A.

The fixed electrode section 38A includes plural fixed electrode fingers 381A to 388A arranged to be formed in a comb teeth shape that are spaced apart from and mesh with the plural movable electrode fingers 361 to 365 of the movable electrode section 36 and a base 389 integrally formed with the fixed electrode fingers 382A, 384A, 386A, and 388A.

Ends of such plural fixed electrode fingers 381A to 388A on the opposite side of the movable section 33 and the base 389 are respectively bonded to portions on the +Y direction side with respect to the hollow section 21 in the upper surface of the insulating substrate 2. Ends on a fixed side of the fixed electrode fingers 381A to 388A are fixed ends. Free ends of the fixed electrode fingers 381A to 388A extend in the −Y direction.

The fixed electrode fingers 381A, 382A, 383A, 384A, 385A, 386A, 387A, and 388A are arranged in this order from the −X direction side to the +X direction side. The fixed electrode fingers 381A and 382A are provided between the movable electrode fingers 361 and 362 to face the movable electrode fingers 361 and 362. The fixed electrode fingers 383A and 384A are provided between the movable electrode fingers 362 and 363 to face the movable electrode fingers 362 and 363. The fixed electrode fingers 385A and 386A are provided between the movable electrode fingers 363 and 364 to face the movable electrode fingers 363 and 364. The fixed electrode fingers 387A and 388A are provided between the movable electrode fingers 364 and 365 to face the movable electrode fingers 364 and 365.

The fixed electrode fingers 382A, 384A, 386A, and 388A are respectively first fixed electrode fingers. The fixed electrode fingers 381A, 383A, 385A, and 387A are respectively second fixed electrode fingers spaced apart from the first fixed electrode fingers via gaps on the insulating substrate 2. In this way, the plural fixed electrode fingers 381A to 388A include the plural first fixed electrode fingers and the plural second fixed electrode fingers that are alternately arranged.

Similarly, the fixed electrode section 39A includes plural fixed electrode fingers 391A to 398A arranged to be formed in a comb teeth shape that are spaced apart from and mesh with the plural movable electrode fingers 371 to 375 of the movable electrode section 37 and a base 399 integrally formed with the fixed electrode fingers 392A, 394A, 396A, and 398A. Ends of such plural fixed electrode fingers 391A to 398A on the opposite side of the movable section 33 and the base 399 are respectively bonded to portions on the −Y direction side with respect to the hollow section 21 in the upper surface of the insulating substrate 2. Ends on a fixed side of the fixed electrode fingers 391A to 398A are fixed ends. Free ends of the fixed electrode fingers 391A to 398A extend in the +Y direction.

The fixed electrode fingers 391A, 392A, 393A, 394A, 395A, 396A, 397A, and 398A are arranged in this order from the −X direction side to the +X direction side. The fixed electrode fingers 391A and 392A are provided between the movable electrode fingers 371 and 372 to face the movable electrode fingers 371 and 372. The fixed electrode fingers 393A and 394A are provided between the movable electrode fingers 372 and 373 to face the movable electrode fingers 372 and 373. The fixed electrode fingers 395A and 396A are provided between the movable electrode fingers 373 and 374 to face the movable electrode fingers 373 and 374. The fixed electrode fingers 397A and 398A are provided between the movable electrode fingers 374 and 375 to face the movable electrode fingers 374 and 375.

The fixed electrode fingers 392A, 394A, 396A, and 398A are respectively first fixed electrode fingers. The fixed electrode fingers 391A, 393A, 395A, and 397A are respectively second fixed electrode fingers spaced apart from the first fixed electrode fingers via gaps on the insulating substrate 2. In this way, the plural fixed electrode fingers 391A to 398A include the plural first fixed electrode fingers and the plural second fixed electrode fingers that are alternately arranged.

In such an element piece 3A, the fixed electrode fingers 382A, 384A, 386A, and 388A, which are the first fixed electrode fingers, project from the base 389 and are integrally formed. Consequently, it is possible to reduce electric resistance among the fixed electrode fingers 382A, 384A, 386A, and 388A. As a result, it is possible to improve detection accuracy of the functional device 1A. Similarly, the fixed electrode fingers 392A, 394A, 396A, and 398A, which are the first fixed electrode fingers, project from the base 399 and are integrally formed. Consequently, it is possible to reduce electric resistance among the fixed electrode fingers 392A, 394A, 396A, and 398A. As a result, it is possible to improve detection accuracy of the functional device 1A.

With the functional device 1A according to the second embodiment explained above, like the functional device 1 according to the first embodiment, it is possible to realize an increase in sensitivity and make shock resistance excellent.

Third Embodiment

Figure 11:
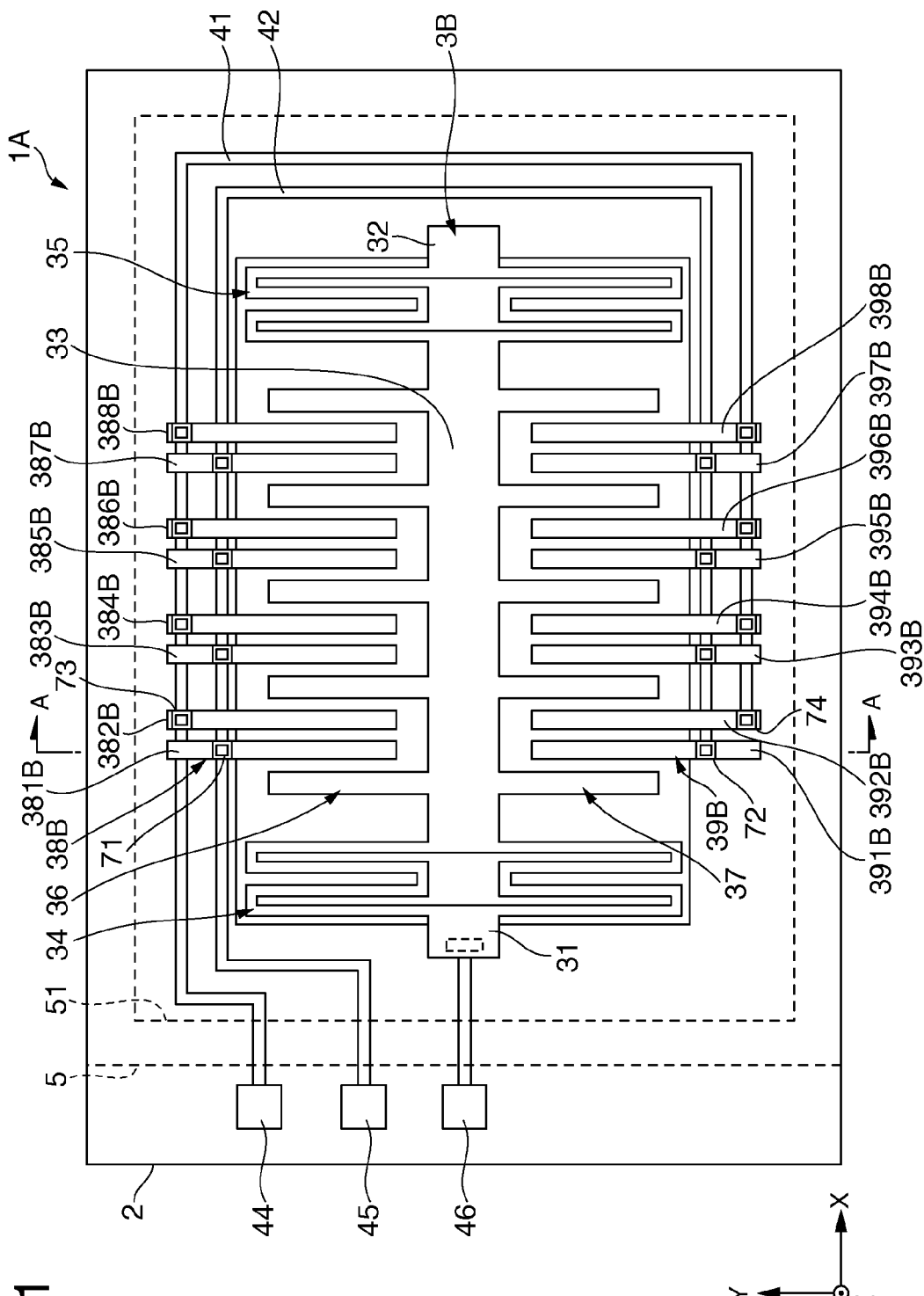
FIG. 11 is a plan view showing a functional device according to a third embodiment of the invention.
Figure 12:
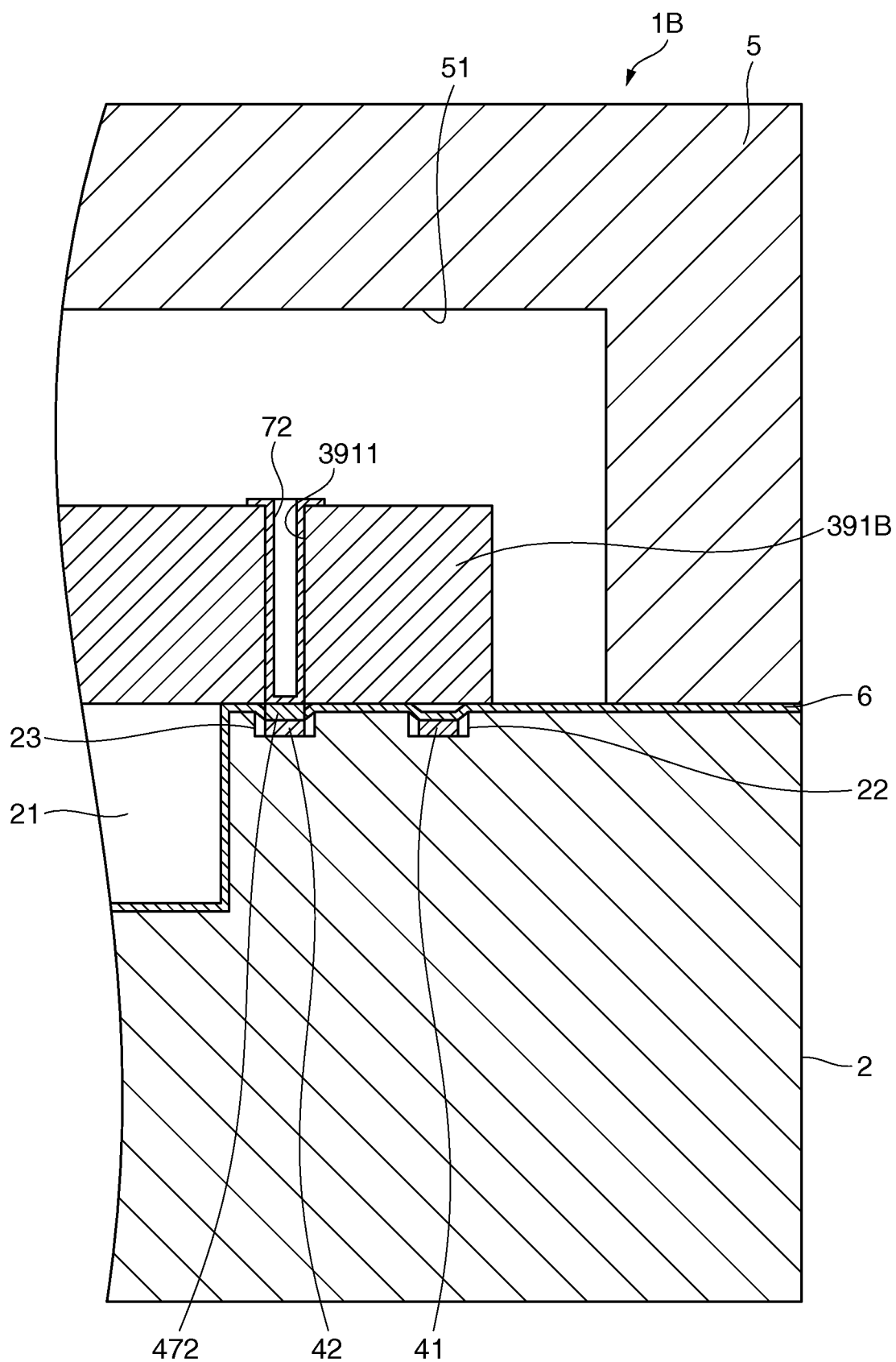
FIG. 12 is a partially enlarged sectional view of the functional device shown in FIG. 11.

A functional device according to a third embodiment of the invention is explained below. FIG. 11 is a plan view showing the functional device according to the third embodiment of the invention. FIG. 12 is a partially enlarged sectional view of the functional device shown in FIG. 11.

The functional device according to this embodiment is the same as the functional device according to the first embodiment except that the configuration of fixed electrode sections is different.

In the following explanation, concerning the functional device according to the third embodiment, differences from the embodiments explained above are mainly explained. Explanation of matters same as those in the embodiments is omitted. In FIGS. 11 and 12, components same as those in the first embodiment are denoted by the same reference numerals and signs.

In a functional device 1B according to this embodiment, an element piece 3B is bonded to the upper surface of the insulating substrate 2.

The element piece 3B includes the fixed sections 31 and 32, the movable section 33, the coupling sections 34 and 35, the movable electrode sections 36 and 37, and fixed electrode sections 38B and 39B.

The fixed electrode section 38B includes plural fixed electrode fingers 381B to 388B arranged to be formed in a comb teeth shape that are spaced apart from and mesh with the plural movable electrode fingers 361 to 365 of the movable electrode section 36.

Ends of such plural fixed electrode fingers 381B to 388B on the opposite side of the movable section 33 are respectively bonded to portions on the +Y direction side with respect to the hollow section 21 in the upper surface of the insulating substrate 2. Ends on a fixed side of the fixed electrode fingers 381B to 388B are fixed ends. Free ends of the fixed electrode fingers 381B to 388B extend in the −Y direction.

The fixed electrode fingers 381B, 382B, 383B, 384B, 385B, 386B, 387B, and 388B are arranged in this order from the −X direction side to the +X direction side. The fixed electrode fingers 381B and 382B are provided between the movable electrode fingers 361 and 362 to face the movable electrode fingers 361 and 362. The fixed electrode fingers 383B and 384B are provided between the movable electrode fingers 362 and 363 to face the movable electrode fingers 362 and 363. The fixed electrode fingers 385B and 386B are provided between the movable electrode fingers 363 and 364 to face the movable electrode fingers 363 and 364. The fixed electrode fingers 387B and 388B are provided between the movable electrode fingers 364 and 365 to face the movable electrode fingers 364 and 365.

The fixed electrode fingers 382B, 384B, 386B, and 388B are respectively first fixed electrode fingers. The fixed electrode fingers 381B, 383B, 385B, and 387B are respectively second fixed electrode fingers spaced apart from the first fixed electrode fingers via gaps on the insulating substrate 2. In this way, the plural fixed electrode fingers 381B to 388B include the plural first fixed electrode fingers and the plural second fixed electrode fingers that are alternately arranged.

In particular, in the fixed electrode fingers 382B, 384B, 386B, and 388B, which are the first fixed electrode fingers, conductor sections 73, which are first conductor sections, piercing through the fixed electrode fingers in the thickness direction thereof are provided. The fixed electrode fingers 382B, 384B, 386B, and 388B are electrically connected to the line 41 via the conductor sections 73. In the fixed electrode fingers 381B, 383B, 385B, and 387B, which are the second fixed electrode fingers, conductor sections 71, which are second conductor sections, piercing through the fixed electrode fingers in the thickness direction thereof are provided. The fixed electrode fingers 381B, 383B, 385B, and 387B are electrically connected to the line 42 via the conductor sections 71.

Similarly, the fixed electrode section 39B includes plural fixed electrode fingers 391B to 398B arranged to be formed in a comb teeth shape that are spaced apart from and mesh with the plural movable electrode fingers 371 to 375 of the movable electrode section 37. Ends of such plural fixed electrode fingers 391B to 398B on the opposite side of the movable section 33 are respectively bonded to portions on the −Y direction side with respect to the hollow section 21 in the upper surface of the insulating substrate 2. Ends on a fixed side of the fixed electrode fingers 391B to 398B are fixed ends. Free ends of the fixed electrode fingers 391B to 398B extend in the +Y direction.

The fixed electrode fingers 391B, 392B, 393B, 394B, 395B, 396B, 397B, and 398B are arranged in this order from the −X direction side to the +X direction side. The fixed electrode fingers 391B and 392B are provided between the movable electrode fingers 371 and 372 to face the movable electrode fingers 371 and 372. The fixed electrode fingers 393B and 394B are provided between the movable electrode fingers 372 and 373 to face the movable electrode fingers 372 and 373. The fixed electrode fingers 395B and 396B are provided between the movable electrode fingers 373 and 374 to face the movable electrode fingers 373 and 374. The fixed electrode fingers 397B and 398B are provided between the movable electrode fingers 374 and 375 to face the movable electrode fingers 374 and 375.

The fixed electrode fingers 392B, 394B, 396B, and 398B are respectively first fixed electrode fingers. The fixed electrode fingers 391B, 393B, 395B, and 397B are respectively second fixed electrode fingers spaced apart from the first fixed electrode fingers via gaps on the insulating substrate 2. In this way, the plural fixed electrode fingers 391B to 398B include the plural first fixed electrode fingers and the plural second fixed electrode fingers that are alternately arranged.

In particular, in the fixed electrode fingers 392B, 394B, 396B, and 398B, which are the first fixed electrode fingers, conductor sections 74, which are first conductor sections, piercing through the fixed electrode fingers in the thickness direction thereof are provided. The fixed electrode fingers 392B, 394B, 396B, and 398B are electrically connected to the line 41 via the conductor sections 74. In the fixed electrode fingers 391B, 393B, 395B, and 397B, which are the second fixed electrode fingers, conductor sections 72, which are second conductor sections, piercing through the fixed electrode fingers in the thickness direction thereof are provided. The fixed electrode fingers 391B, 393B, 395B, and 397B are electrically connected to the line 42 via the conductor sections 72.

Conductor sections 71 to 74 are specifically explained. Since the conductor sections 71 to 74 have the same configuration, the conductor section 71 provided in the fixed electrode finger 391B is representatively explained.

As shown in FIG. 12, in the fixed electrode finger 391B, a through-hole 3911 piercing through the fixed electrode finger 391B in the thickness direction is formed. The through-hole 3911 is formed in a position corresponding to the protrusion 472 on the line 42. The conductor section 71 is formed on the inner circumferential surface of the through-hole 3911 and on the protrusion 472.

By providing such conductor sections 71 to 74, it is possible to more surely electrically connect the fixed electrode fingers 382, 384, 386, 388, 392, 394, 396, and 398, which are the first fixed electrode fingers, and the line 41, which is the first line, and electrically connect the fixed electrode fingers 381, 383, 385, 387, 391, 393, 395, and 397, which are the second fixed electrode fingers, and the line 42, which is the second line.

Such conductor sections 71 to 74 can be formed by using the film formation method explained above.

Figure 13:
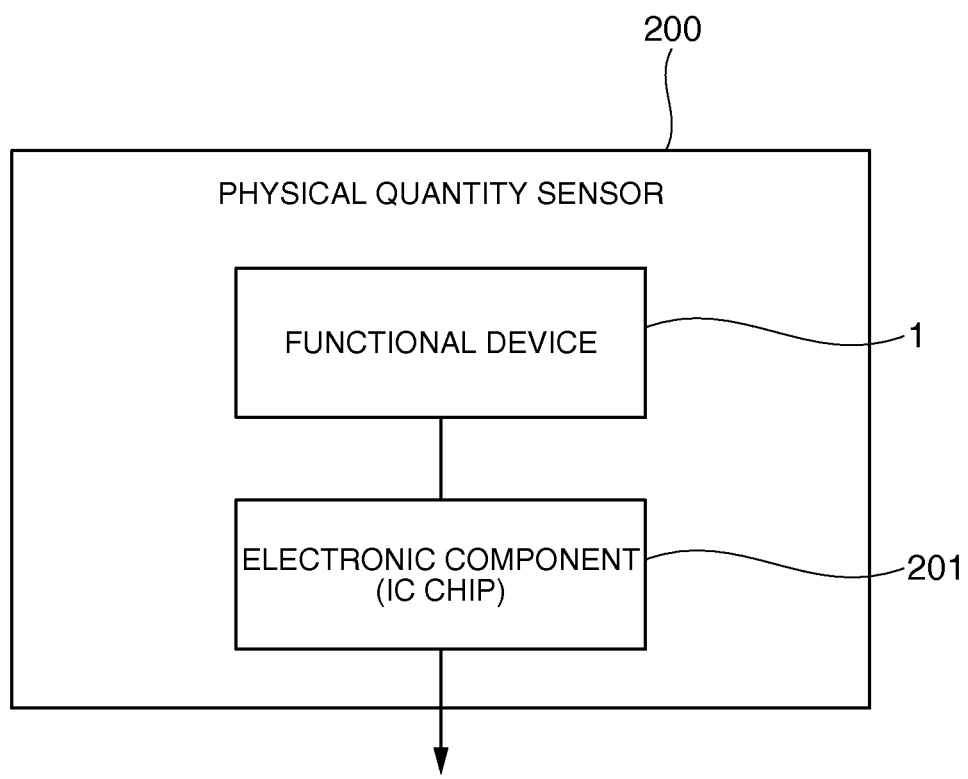
FIG. 13 is a schematic diagram showing an example of a physical quantity sensor according to an embodiment of the invention.

With the functional device 1B according to the third embodiment explained above, like the functional device 1 according to the first embodiment, it is possible to realize an increase in sensitivity and make shock resistance excellent.
Physical Quantity Sensor A physical quantity sensor including a functional device according to an embodiment of the invention is explained below with reference to FIG. 13. FIG. 13 is a schematic diagram showing an example of the physical quantity sensor according to the embodiment.

A physical quantity sensor 200 shown in FIG. 13 includes the functional device 1 and an electronic component 201 electrically connected to the functional device 1.

The electronic component 201 is, for example, an integrated circuit element (IC) and has a function of driving the functional device 1. An angular velocity detecting circuit or an acceleration detecting circuit is formed in the electronic component 201, whereby the physical quantity sensor 200 can be configured as a gyro sensor or an acceleration sensor.

In FIG. 13, the physical quantity sensor 200 includes one functional device 1. However, the physical quantity sensor 200 may include plural functional devices 1. The physical quantity sensor 200 may include the functional device 1 and a functional device having a configuration different from that of the functional device 1.

Since the physical quantity sensor 200 includes the functional device 1 excellent in sensitivity and shock resistance, the physical quantity sensor 200 has excellent reliability.
Electronic Apparatus An electronic apparatus according to an embodiment of the invention is explained below.

Figure 14:
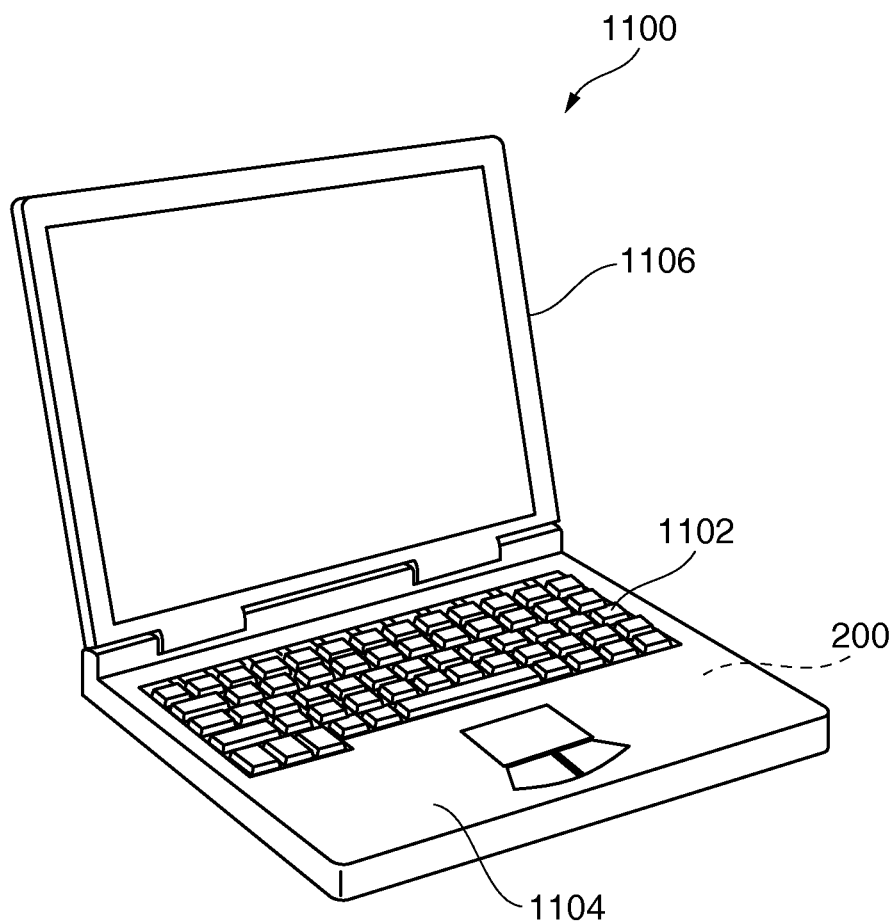
FIG. 14 is a diagram of an electronic apparatus (a notebook personal computer) according to an embodiment of the invention.

FIG. 14 is a perspective view showing the configuration of a mobile (notebook) personal computer to which the electronic apparatus according to the embodiment is applied.

In the figure, a personal computer 1100 includes a main body section 1104 including a keyboard 1102 and a display unit 1106. The display unit 1106 is pivotably supported with respect to the main body section 1104 via a hinge structure section.

The functional device 1 is built in such a personal computer 1100.

Figure 15:
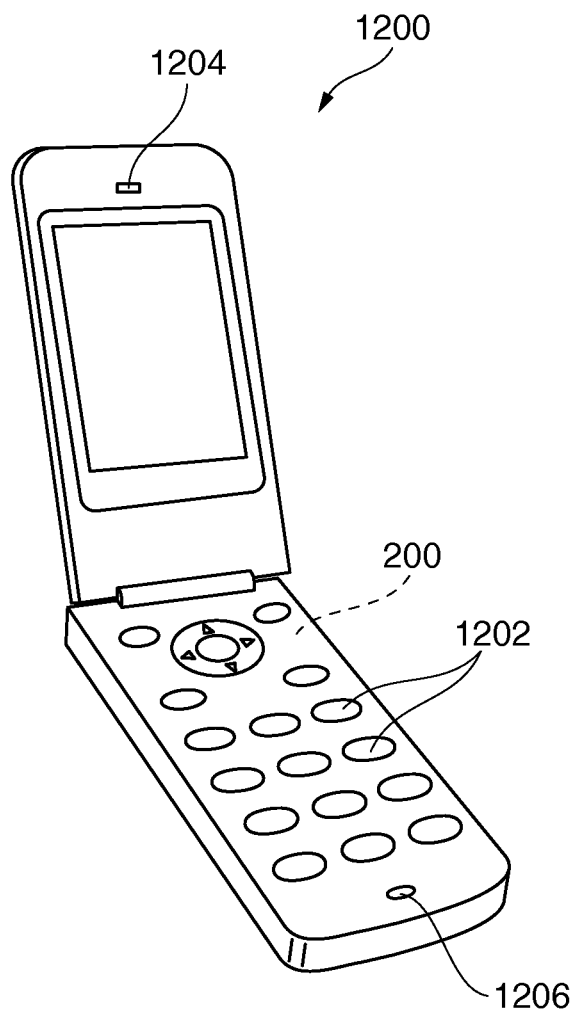
FIG. 15 is a diagram of an electronic apparatus (a cellular phone) according to an embodiment of the invention.

FIG. 15 is a perspective view showing the configuration of a cellular phone (including a PHS) to which the electronic apparatus according to the embodiment is applied.

In the figure, a cellular phone 1200 includes an antenna (not shown), plural operation buttons 1202, an earpiece 1204, and a mouthpiece 1206. A display section is arranged between the operation buttons 1202 and the earpiece 1204.

The functional device 1 is built in such a cellular phone 1200.

Figure 16:
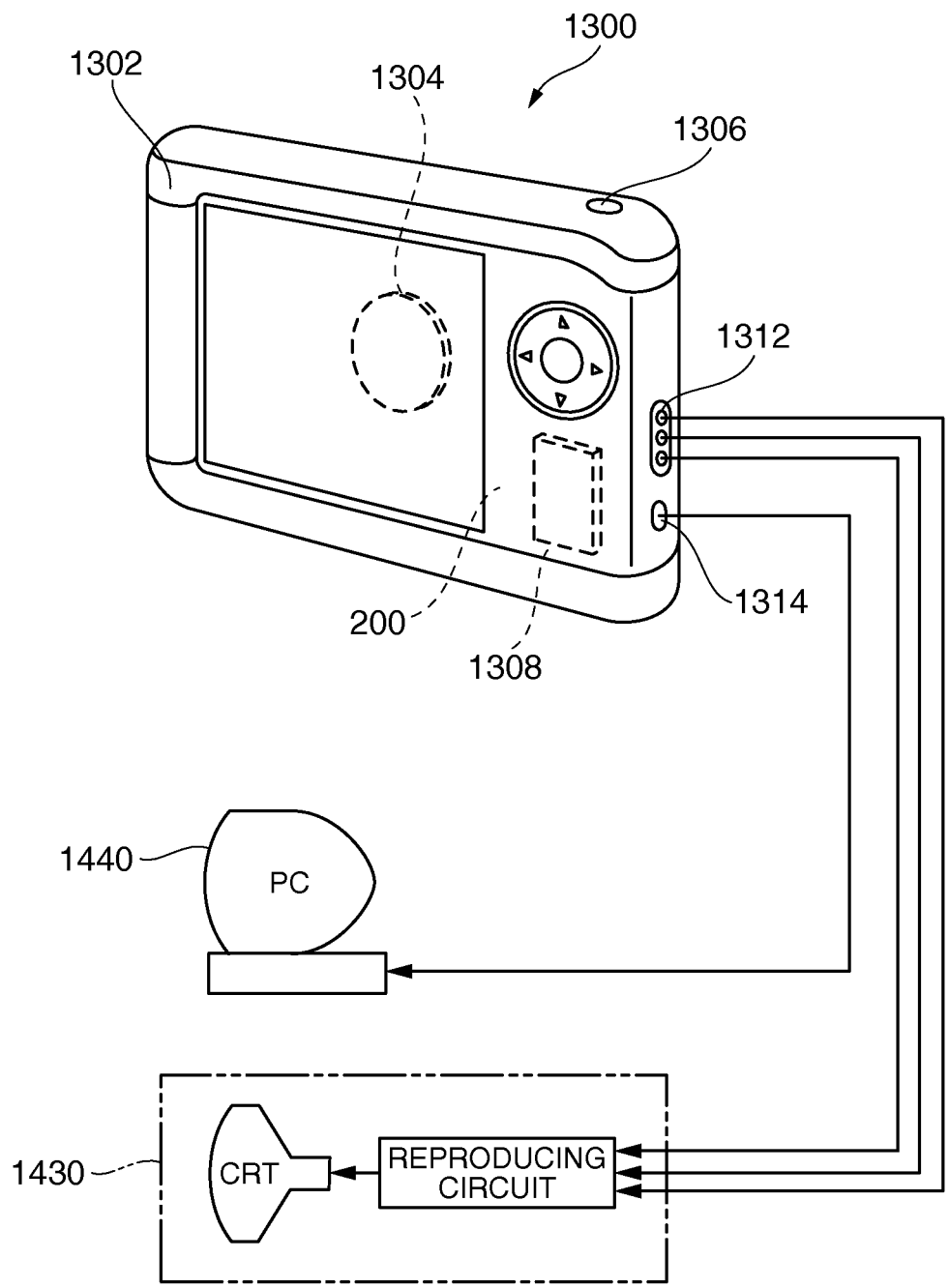
FIG. 16 is a diagram of an electronic apparatus (a digital still camera) according to an embodiment of the invention.

FIG. 16 is a perspective view showing the configuration of a digital still camera to which the electronic apparatus according to the embodiment is applied. In the figure, connection to external apparatuses is briefly shown.

Whereas an ordinary camera exposes a silver salt photograph film with an optical image of a subject, a digital still camera 1300 photoelectrically converts the optical image of the subject using an imaging device such as a CCD (Charge Coupled Device) to generate an imaging signal (an image signal).

A display section is provided in the back of a case (a body) 1302 in the digital still camera 1300. The digital still camera 1300 is configured to perform display on the basis of the imaging signal generated by the CCD. The display section functions as a finder that displays the subject as an electronic image.

A light receiving unit 1304 including an optical lens (an imaging optical system) and a CCD is provided on the front side (in the figure, the back side) of the case 1302.

When a photographer checks a subject image displayed on the display section and depresses a shutter button 1306, an imaging signal of the CCD at that point is transferred to and stored in a memory 1308.

In the digital still camera 1300, a video signal output terminal 1312 and an input and output terminal 1314 for data communication are provided on a side of the case 1302. As shown in the figure, a television monitor 1430 is connected to the video signal output terminal 1312 and a personal computer 1440 is connected to the input and output terminal 1314 for data communication according to necessity. Further, the imaging signal stored in the memory 1308 is output to the television monitor 1430 and the personal computer 1440.

The functional device 1 is built in such a digital still camera 1300.

Since such an electronic apparatus includes the functional device 1 excellent in sensitivity and shock resistance, the electronic apparatus has excellent reliability.

Besides the personal computer (the mobile personal computer) shown in FIG. 14, the cellular phone shown in FIG. 15, and the digital still camera shown in FIG. 16, the electronic apparatus according to the embodiment can also be applied to, for example, an inkjet ejection apparatus (e.g., an inkjet printer), a laptop personal computer, a television, a video camera, a video tape recorder, a car navigation apparatus, a pager, an electronic notebook (including an electronic notebook with a communication function), an electronic dictionary, a calculator, an electronic game apparatus, a word processor, a work station, a videophone, a security television monitor, an electronic binocular, a POS terminal, medical apparatuses (e.g., an electronic clinical thermometer, a sphygmomanometer, a blood glucose meter, an electrocardiogram measuring apparatus, an ultrasonic diagnosis apparatus, and an electronic endoscope), a fish finder, various measuring apparatuses, meters (e.g., meters for a vehicle, an aircraft, and a ship), a flight simulator, and the like.

The functional device, the method of manufacturing the functional device, the physical quantity sensor, and the electronic apparatus according to the embodiments of the invention are explained with reference to the drawings. However, the invention is not limited to the embodiments.

For example, the fixed electrode section is not limited to the embodiments as long as at least one of the plural fixed electrode fingers arranged to be formed in a comb teeth shape is separated from the other fixed electrode fingers on the insulating substrate.

Forms such as the number, the arrangement, and the size of the plural fixed electrode fingers of the fixed electrode section and the plural movable electrode fingers of the movable electrode section provided to mesh with the fixed electrode fingers are not limited to the embodiments.

The movable section may be configured to be displaced in the Y axis direction or may be configured to be pivoted about an axis parallel to the X axis. In this case, physical quantities only have to be detected on the basis of a capacitance change corresponding to a change in an opposed area of the movable electrode fingers and the fixed electrode fingers.

In the explanation of the embodiments, the functional device 1 is used as the physical quantity sensor device. However, the functional device according to the embodiments is not limited to the physical quantity sensor device and may be used as, for example, a resonator that applies different voltages to the fixed electrode fingers and the movable electrode fingers and drives the movable electrode fingers with Coulomb force to thereby oscillate an inherent frequency.

The entire disclosure of Japanese Patent Application No. 2010-247498, filed Nov. 4, 2010 is expressly incorporated by reference herein.

What is claimed is:

1. A functional device comprising:
   an insulating substrate that has a center recess and a peripheral ledge;
   first and second fixed electrodes provided on and over the insulating substrate, first ends of the first and second fixed electrodes being bonded on the peripheral ledge of the insulating substrate, second ends, which are opposite to the first ends, of the first and second fixed electrodes being located over a bottom of the center recess of the insulating substrate with an air gap;
   first and second recessed sections provided in the peripheral ledge of the insulating substrate;
   first and second electrode lines respectively provided in the first and second recessed sections so as to surround the first and second fixed electrodes;
   a first protrusion provided in the first recessed section and electrically connecting the first fixed electrode to the first electrode line, the first protrusion being made of a metal; and
   a second protrusion provided in the second recessed section and electrically connecting the second fixed electrode to the second electrode line, the second protrusion being made of a metal, wherein
   bonded bottom surfaces of the first ends of the first and second fixed electrodes are flat,
   the first electrode line is electrically connected to the first fixed electrode via the first protrusion,
   the second electrode line surrounds the first electrode line and is electrically connected to the second fixed electrode via the second protrusion, and
   when depths of the first and second recessed sections are respectively d1 and d2, thicknesses of the first and second electrode lines are respectively t1 and t2, and heights of the first and second protrusions are respectively h1 and h2, the following relations are satisfied:

$$d1 \approx t1 + h1; \text{ and}$$

$$d2 \approx t2 + h2.$$

2. The functional device according to claim 1, further comprising:
   a movable electrode provided over the bottom of the center recess of the insulating substrate with the air gap and arranged between the first and second fixed electrodes.

3. The functional device according to claim 2, wherein a fixed section is provided on the peripheral ledge of the insulating substrate, and the movable electrode is connected to the fixed section via a coupling section.

4. The functional device according to claim 1, wherein the first and second electrode lines include portions where an insulating film is provided.

5. The functional device according to claim 1, wherein
   a conductor section piercing through at least one of the first fixed electrode and the second fixed electrode in a thickness direction thereof is provided in at least one of the first and second fixed electrodes, and
   the conductor section is connected to at least one of the first and second electrode lines.

6. The functional device according to claim 1, wherein the first and second electrode lines are formed of a light-transmissive electrode material.

7. The functional device according to claim 1, wherein
   the insulating substrate is formed of a material containing an alkali metal ion,
   the first and second fixed electrodes are formed of a semiconductor, and
   the first ends of the first and second fixed electrodes are bonded to the peripheral ledge of the insulating substrate by an anode bonding method.

8. The functional device according to claim 1, wherein the first and second fixed electrodes are formed of a single member.

9. The functional device according to claim 1, wherein
   a plurality of the first fixed electrodes and a plurality of the second fixed electrodes are provided, and
   at least one of the first and second fixed electrodes are integrally provided.

10. A method of manufacturing a functional device comprising:
    forming a center recess in a first substrate so that the center recess is surrounded by a peripheral ledge of the first substrate;
    forming first and second recessed sections in the peripheral ledge of the first substrate;
    forming first and second electrode lines in the first and second recessed sections, respectively;
    forming first and second protrusions on the first and second electrode lines, respectively, each of the first and second protrusions being made of a metal;
    placing a second substrate on the peripheral ledge of the first substrate by a bonding method so as to face the first and second recessed sections; and
    etching the second substrate to thereby form a first fixed electrode and a second fixed electrode, first ends of the first and second fixed electrodes, which are bonded on the peripheral ledge of the first substrate, being electrically connected to the first and second electrode lines via the first and second protrusions, respectively, and second ends, which are opposite to the first ends, of the first and second fixed electrodes being located over a bottom of the center recess of the first substrate with an air gap, wherein bonded bottom surfaces of the first ends of the first and second fixed electrodes are flat, the first and second electrode lines surround the first and second fixed electrodes, the second electrode line surrounds the first electrode line, and when depths of the first and second recessed sections are respectively d1 and d2, thicknesses of the first and second electrode lines are respectively t1 and t2, and heights of the first and second protrusions are respectively h1 and h2, the following relations are satisfied:

$d1 \approx t1 + h1$; and $d2 \approx t2 + h2$.

11. A physical quantity sensor comprising the functional device according to claim 1.

12. An electronic apparatus comprising the functional device according to claim 1.

13. The functional device according to claim 1, wherein the insulating substrate is glass.

14. The functional device according to claim 13, wherein the glass has an alkali metal ion.

15. The functional device according to claim 14, wherein the alkali metal ion is a movable ion.

16. The method of manufacturing a functional device according claim 10, wherein
the first substrate is glass.

17. The method of manufacturing a functional device according claim 16, wherein
the glass has an alkali metal ion.

18. The method of manufacturing a functional device according claim 17, wherein
the alkali metal ion is a movable ion.

19. The functional device according to claim 1, wherein
one end of the first electrode line is connected to a first peripheral electrode,
one end of the second electrode line is connected to a second peripheral electrode, and
the first and second peripheral electrodes are located at a first peripheral side of the peripheral ledge of the insulating substrate.

20. The method of manufacturing a functional device according to claim 10, wherein
one end of the first electrode line is connected to a first peripheral electrode,
one end of the second electrode line is connected to a second peripheral electrode, and
the first and second peripheral electrodes are located at a first peripheral side of the peripheral ledge of the first substrate.

* * * * *